United States Patent
Katsuhara et al.

(10) Patent No.: US 12,372,419 B2
(45) Date of Patent: Jul. 29, 2025

(54) PRESSURE SENSOR AND ELECTRONIC APPARATUS

(71) Applicant: Sony Group Corporation, Tokyo (JP)

(72) Inventors: Tomoko Katsuhara, Tokyo (JP); Kei Tsukamoto, Tokyo (JP); Hiroshi Mizuno, Tokyo (JP); Taizo Nishimura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 590 days.

(21) Appl. No.: 17/298,717

(22) PCT Filed: Dec. 3, 2019

(86) PCT No.: PCT/JP2019/047220
§ 371 (c)(1),
(2) Date: Jun. 1, 2021

(87) PCT Pub. No.: WO2020/116445
PCT Pub. Date: Jun. 11, 2020

(65) Prior Publication Data
US 2022/0049997 A1  Feb. 17, 2022

(30) Foreign Application Priority Data
Dec. 6, 2018  (JP) .................. 2018-229338

(51) Int. Cl.
*G01L 1/14* (2006.01)
*G06F 3/044* (2006.01)

(52) U.S. Cl.
CPC ........... *G01L 1/142* (2013.01); *G06F 3/0445* (2019.05)

(58) Field of Classification Search
CPC .............. G01L 1/14; G01L 1/42; G01L 1/148
See application file for complete search history.

(56) References Cited

U.S. PATENT DOCUMENTS

| 2009/0273483 A1 | 11/2009 | Tompkins |
| 2012/0222498 A1 | 9/2012 | Mamigonians |

(Continued)

FOREIGN PATENT DOCUMENTS

| CN | 105190492 A | 12/2015 |
| CN | 107209614 A | 9/2017 |

(Continued)

OTHER PUBLICATIONS

Hirukoi et al., Sensor, Input Device, Keyboard, and Electronic Apparatus, Aug. 2016, FIT Computer Translation (Year: 2016).*

(Continued)

*Primary Examiner* — Erika J. Villaluna
(74) *Attorney, Agent, or Firm* — K&L Gates LLP

(57) ABSTRACT

A pressure sensor is a pressure sensor that includes: a capacitive sensor electrode layer that includes a plurality of sensing units; a first reference electrode layer that faces a first surface of the sensor electrode layer; a second reference electrode layer that faces a second surface of the sensor electrode layer; an elastic layer disposed between the first reference electrode layer and the sensor electrode layer; and a gap layer disposed between the second reference electrode layer and the sensor electrode layer. In the pressure sensor, the sensor electrode layer, the first reference electrode layer, and the second reference electrode layer have a slit.

14 Claims, 21 Drawing Sheets

(56) References Cited

U.S. PATENT DOCUMENTS

2017/0315165 A1  11/2017  Kawaguchi
2018/0004306 A1  1/2018  Ebisui et al.

FOREIGN PATENT DOCUMENTS

| JP | H07151623 A | 6/1995 |
| JP | 2006-250564 A | 9/2006 |
| JP | 2007-205966 A | 8/2007 |
| JP | 2011-105138 A | 6/2011 |
| JP | 2011-237288 A | 11/2011 |
| JP | 2016-146146 A | 8/2016 |
| WO | WO2012165082 | 12/2012 |

OTHER PUBLICATIONS

Kawahira et al., Load Sensor, JP 2006-250564 A, Sep. 2006, FIT Machine Translation (Year: 2006).*
Kawahira et al., Hybrid Sensor, Aug. 2007, FIT Machine Translation (Year: 2007).*
International Search Report issued in International Patent Application No. PCT/JP2019/047220 on Jan. 7, 2020 and English translation of same. 5 pages.
Written Opinion issued in International Patent Application No. PCT/JP2019/047220 on Jan. 7, 2020. 5 pages.

\* cited by examiner

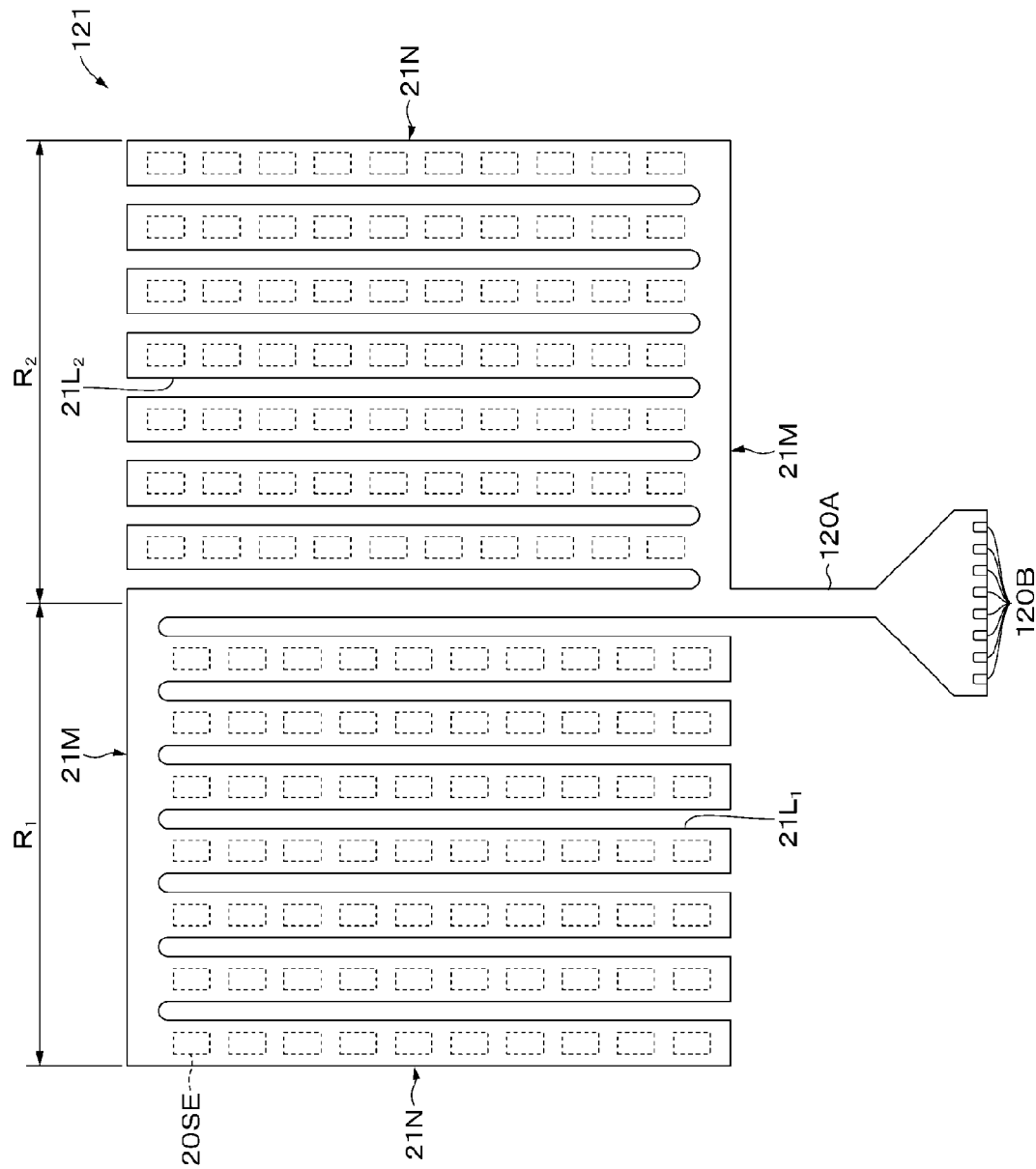

PRESSURE SENSOR AND ELECTRONIC APPARATUS

TECHNICAL FIELD

The present disclosure relates to pressure sensors and electronic apparatuses.

BACKGROUND ART

A film-like pressure sensor that is attached to a curved surface and is capable of detecting a pressure applied to the curved surface is desired these days. For example, Patent Document 1 discloses a variable-resistance pressure sensor in which the base film has a belt-like configuration so as to cope with a curved surface, and slits for reducing the tensile force to be generated by bending are formed in the cover film.

CITATION LIST

Patent Document

Patent Document 1: WO 2012/165082 A

SUMMARY OF THE INVENTION

Problems to be Solved by the Invention

However, wrinkles are easily formed when a film-like pressure sensor is bonded to a curved surface. Wrinkles are likely to appear particularly when the pressure sensor is bonded to a curved surface having non-uniform curvature. Because wrinkles appear in the pressure sensor in this manner, uneven sensitivity, a dead region, and the like are formed.

An object of the present disclosure is to provide a pressure sensor capable of reducing the occurrence of wrinkles when bonded to a curved surface, and an electronic apparatus.

Solutions to Problems

To solve the above problem, a first disclosure is a pressure sensor that includes:

a sensor electrode layer that is of a capacitive type and includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, in which the sensor electrode layer, the first reference electrode layer, and the second reference electrode layer have a slit.

A second disclosure is a pressure sensor that includes:

a sensor electrode layer that is of a capacitive type and includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, in which the sensor electrode layer, the first reference electrode layer, and the second reference electrode layer have a trunk portion and a plurality of branch portions extending like branches from the trunk portion.

A third disclosure is a pressure sensor that includes:

a sensor electrode layer that includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, in which the sensor electrode layer, the first reference electrode layer, and the second reference electrode layer have a slit.

A fourth disclosure is an electronic apparatus that includes:

an exterior member having a curved surface; and the pressure sensor of the first disclosure, the second disclosure, or the third disclosure, the pressure sensor being bonded to the curved surface.

Effects of the Invention

According to the present disclosure, it is possible to reduce the occurrence of wrinkles at the time of bonding to a curved surface. Note that the effects of the present technology are not necessarily limited to the effects described herein, and may include any of the effects described in the present disclosure or any different effect from those described in the present disclosure.

BRIEF DESCRIPTION OF DRAWINGS

FIG. 10 is a plan view showing the shape of a sensor electrode layer.

MODES FOR CARRYING OUT THE INVENTION

Embodiments of the present disclosure will be described in the following order.

1 First embodiment (an example of a sensor and an electronic apparatus including the sensor)

2 Second embodiment (an example of a sensor)

1 First Embodiment

[Configuration of an Electronic Apparatus]

Figure 1:
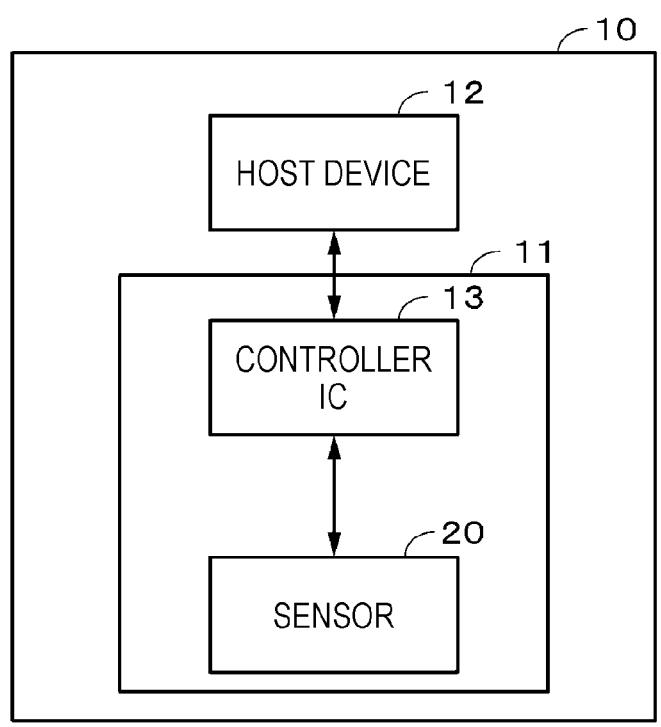
FIG. 1 is a block diagram showing the configuration of an electronic apparatus according to a first embodiment of the present disclosure.

FIG. 1 shows the configuration of an electronic apparatus 10 according to a first embodiment of the present disclosure. The electronic apparatus 10 includes a sensor module 11 and a host device 12 that is the main device of the electronic apparatus 10. The electronic apparatus 10 has an exterior member such as a housing having a curved surface with non-uniform curvature. The electronic apparatus 10 detects pressure on this curved surface with the sensor module 11, and operates in accordance with a result of the detection.

(Sensor Module)

The sensor module 11 includes a sensor 20 and a controller IC 13 as a control unit. The sensor 20 detects a change in capacitance in response to pressure applied to the curved surface of the electronic apparatus 10, and outputs an output signal corresponding to the change to the controller IC 13. The controller IC 13 controls the sensor 20, detects the pressing force applied to the sensor 20 on the basis of the output signal supplied from the sensor 20, and outputs the detected value to the host device 12.

[Configuration of the Sensor]

Figure 2:
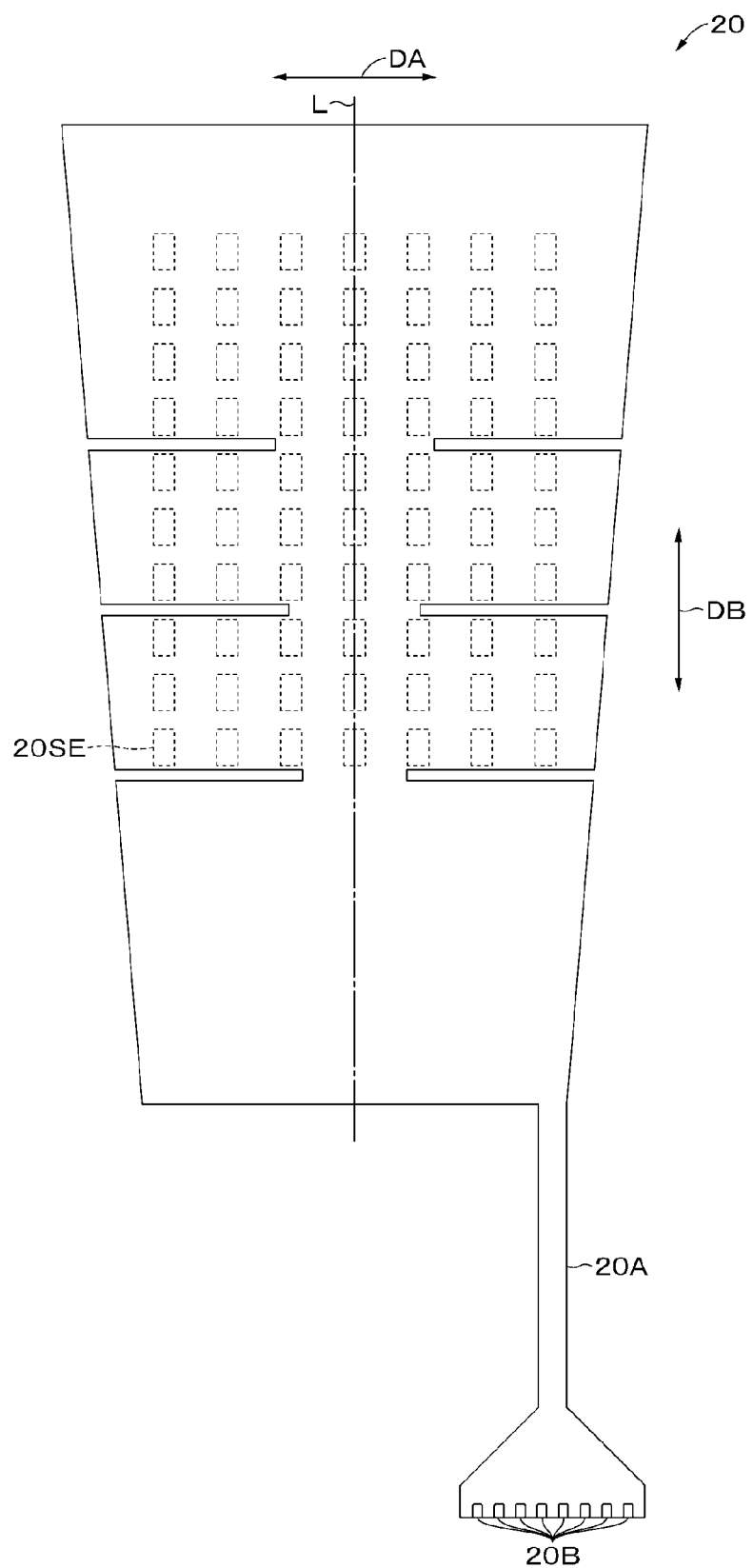
FIG. 2 is a plan view showing a sensor in a planar state.
Figure 3:
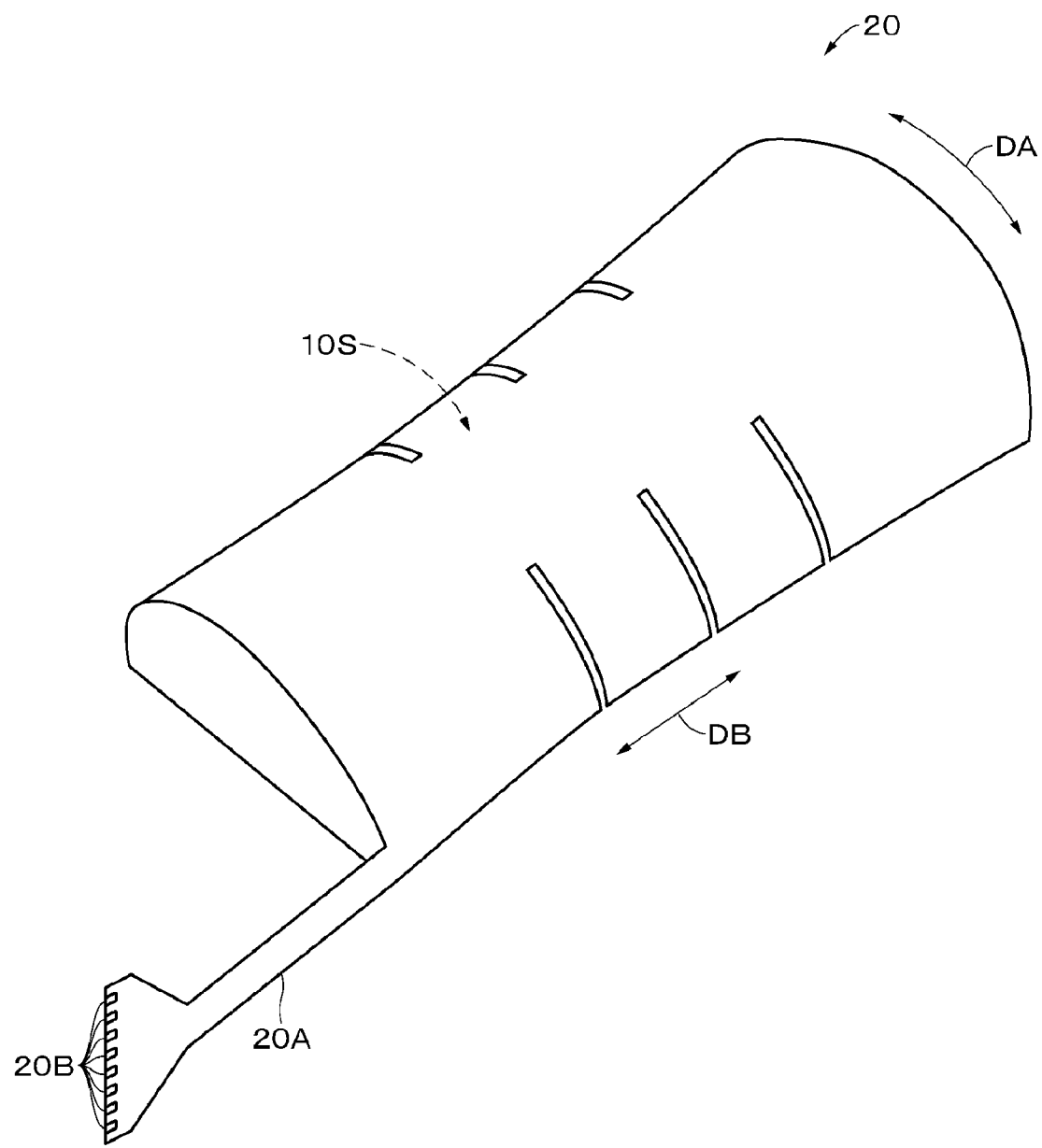
FIG. 3 is a perspective view of the sensor bonded to a curved surface with non-uniform curvature.

FIG. 2 shows the sensor 20 in a planar state. FIG. 3 shows the sensor 20 attached to a curved surface 10S with non-uniform curvature. The sensor 20 is a so-called capacitive pressure sensor, and is in the form of a trapezoidal film. Note that, in the present disclosure, films are defined to include sheets. The sensor 20 is preferably applied to a curved surface (such as an ellipsoidal surface, a free-form surface, a single-sheet hyperboloid, an adjustable surface, for example) or a spherical surface with non-uniform curvature.

A film-like connecting portion 20A extends from part of a peripheral edge of the sensor 20. At the tip of the connecting portion 20A, a plurality of connection terminals 20B for connecting to the circuit board (not shown) of the host device 12 is provided. The controller IC 13 is disposed on the circuit board.

The sensor 20 includes a plurality of sensing units 20SE. The plurality of sensing units 20SE is for detecting the pressure applied to the curved surface 10S on the basis of a change in capacitance. The plurality of sensing units 20SE is arranged in a matrix. The sensing units 20SE have a square shape, for example. However, the shape of the sensing units 20SE is not limited to any particular shape, and may be a polygonal shape or the like, other than a circular shape, an elliptical shape, or a square shape.

The entire sensor 20 is preferably integrated as one component. The slit positions, the slit pitch, and the like of the respective layers constituting the sensor 20 are changed, so that a sense of unity can be given to the sensor 20. Further, it is possible to improve the ease of mounting and the durability against peeling and the like.

Figure 4:
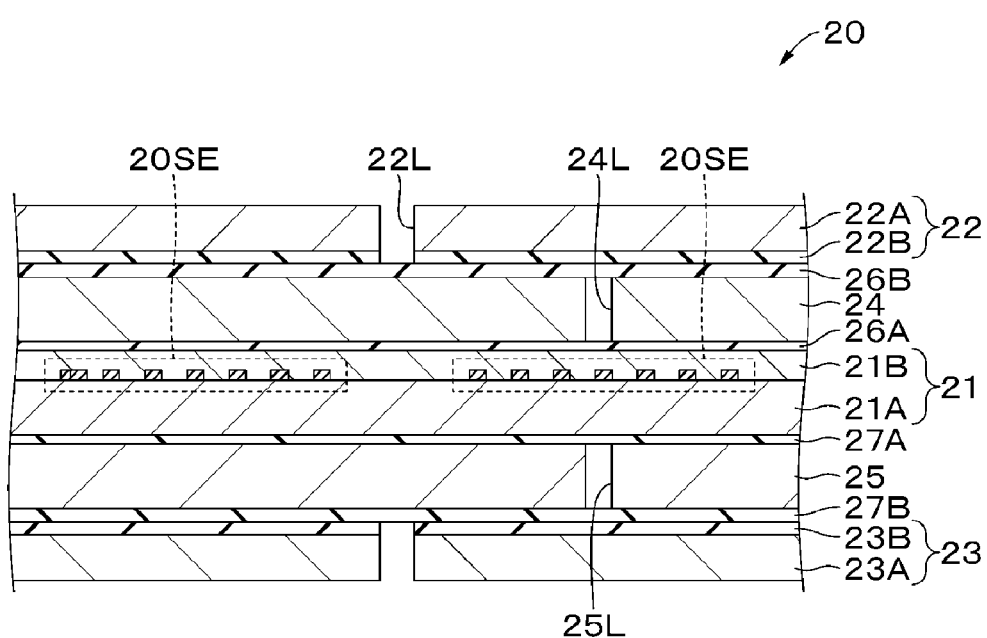
FIG. 4 is a cross-sectional diagram showing the configuration of the sensor.

FIG. 4 shows a cross-section of the sensor 20. The sensor 20 includes a capacitive sensor electrode layer 21, electrode base members 22 and 23, an elastic layer 24, a gap layer 25, and adhesive layers 26A, 26B, 27A, and 27B. The surface of the sensor 20 on the side of the electrode base member 23 is bonded to the curved surface 10S via an adhesive layer (not shown).

The sensor electrode layer 21 and the electrode base member 22 are disposed so that principal surfaces of the sensor electrode layer 21 and the electrode base member 22 face each other. The elastic layer 24 is disposed between the principal surfaces of the sensor electrode layer 21 and the electrode base member 22. The sensor electrode layer 21 and the elastic layer 24 are bonded to each other by the adhesive layer 26A, and the electrode base member 22 and the elastic layer 24 are bonded to each other by the adhesive layer 26B. Note that the adhesive layers 26A and 26B are provided as needed, and may not be provided in a case where the elastic layer 24 has adhesiveness, for example.

The sensor electrode layer 21 and the electrode base member 23 are disposed so that principal surfaces of the sensor electrode layer 21 and the electrode base member 23 face each other. The gap layer 25 is disposed between the principal surfaces of the sensor electrode layer 21 and the electrode base member 23. The sensor electrode layer 21 and the gap layer 25 are bonded to each other by the adhesive layer 27A, and the electrode base member 23 and the gap layer 25 are bonded to each other by the adhesive layer 27B. Note that the adhesive layers 27A and 27B are provided as needed, and may not be provided in a case where the gap layer 25 has adhesiveness, for example.

(Sensor Electrode Layer)

Figure 5:
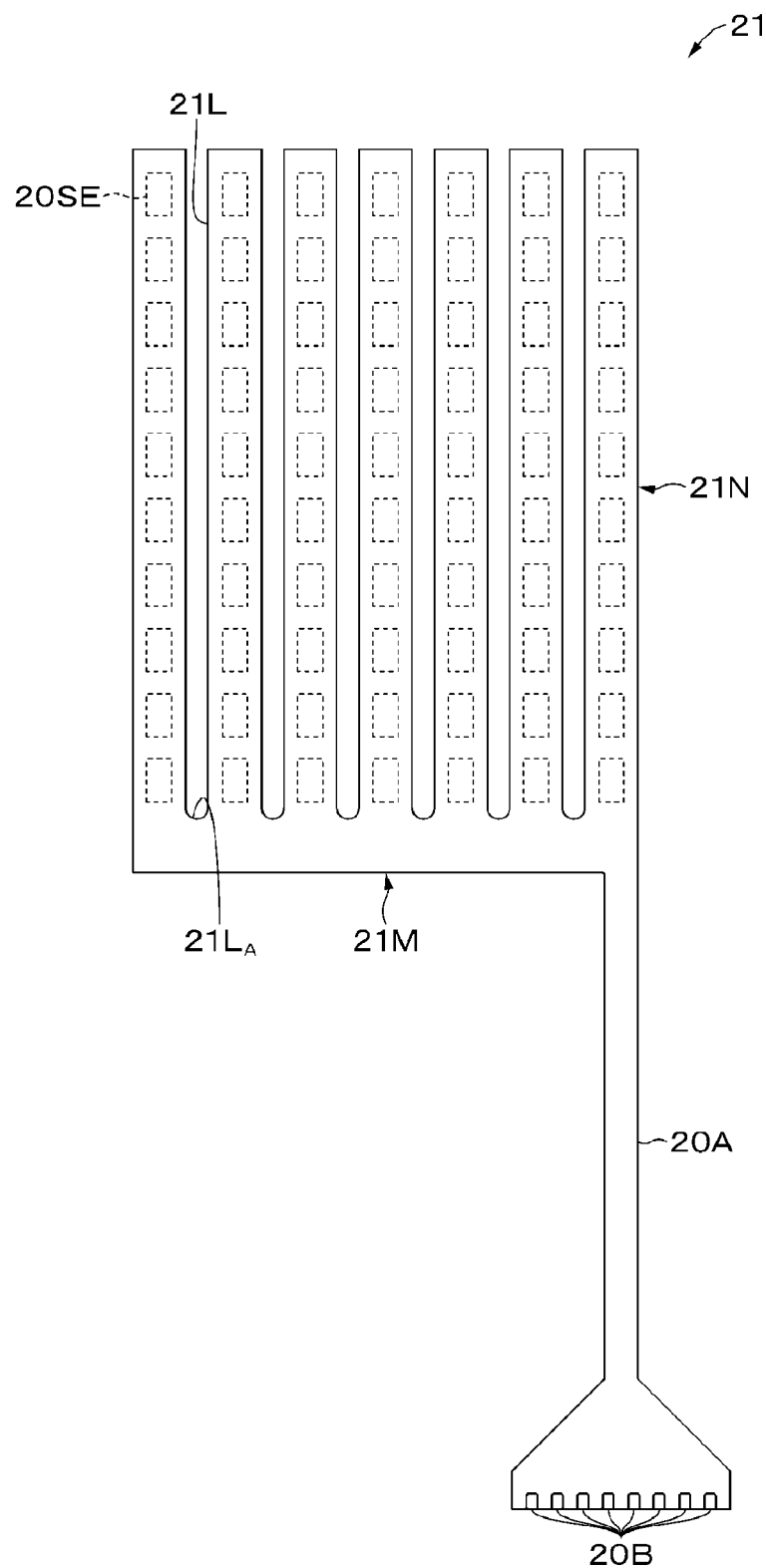
FIG. 5 is a plan view showing the shape of a sensor electrode layer.

FIG. 5 shows the shape of the sensor electrode layer 21. The sensor electrode layer 21 has a plurality of slits 21L extending in one direction, and has a comb-like shape as a whole. Specifically, the sensor electrode layer 21 includes a trunk portion 21M and a plurality of branch portions 21N extending like branches from the trunk portion 21M. Slits 21L are formed between the adjacent branch portions 21N. An R portion is preferably formed at the end $21L_A$ of each slit 21L, to prevent tearing of the electrode base member 22. The slits 21L are formed between the rows of the sensing unit 20SE.

As shown in FIG. 4, the sensor electrode layer 21 includes a flexible film-like base member 21A, a plurality of the sensing units 20SE provided on one principal surface of the base member 21A, and a protective layer 21B that covers the one principal surface of the base member 21A on which these sensing units 20SE are provided. The sensor electrode layer 21 may have elasticity.

The base member 21A contains polymer resin, and has flexibility. The polymer resin may be polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyether sulfone, polysulfone, polypropylene (PP), diacetyl cellulose, polyvinyl chloride, epoxy resin, urea resin, urethane resin, melamine resin, cyclic olefin polymer (COP), norbornene thermoplastic resin, or the like, for example. However, the polymer resin contained in the base member 21A is not limited to these polymer resins.

Figure 6:
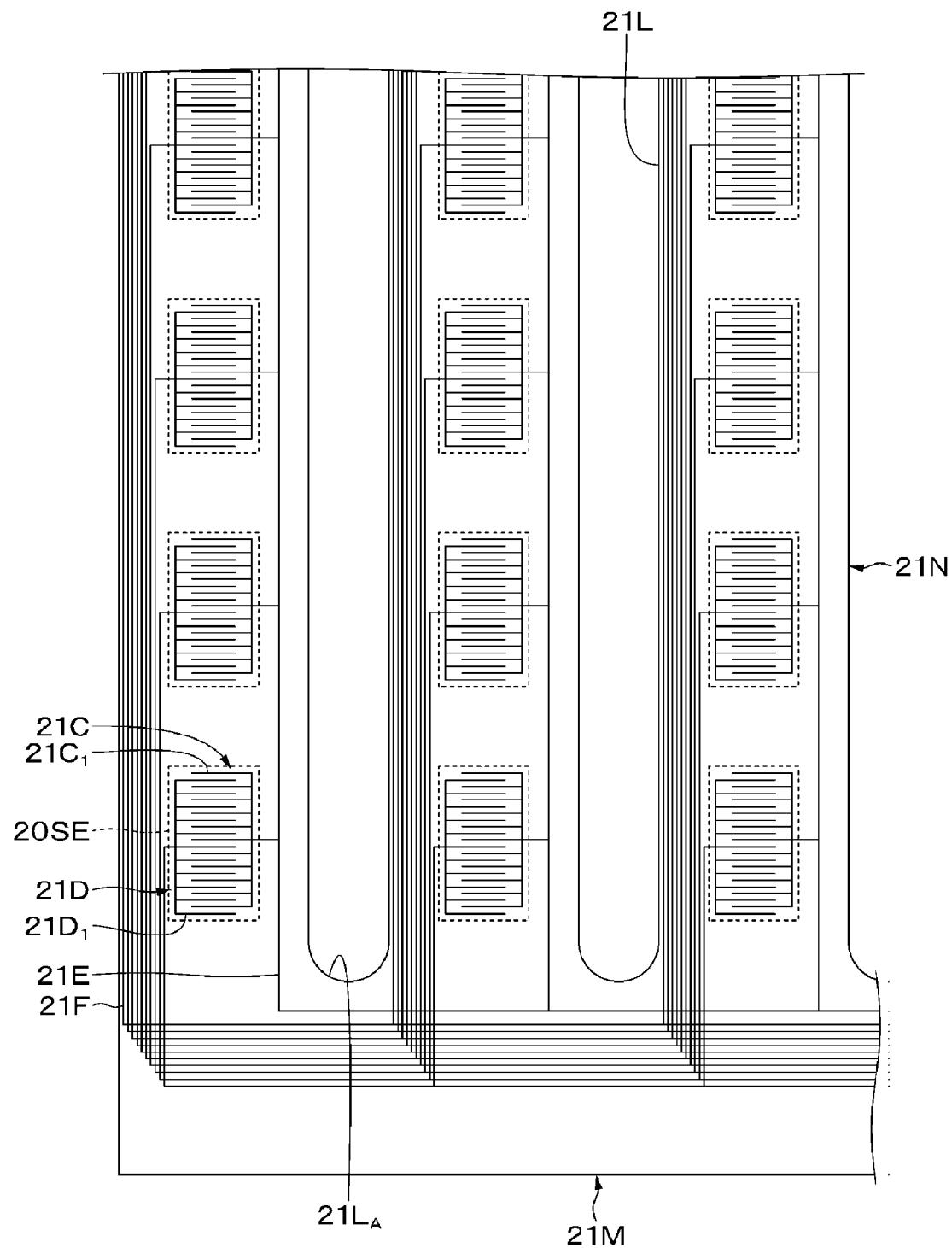
FIG. 6 is an enlarged plan view showing the configuration of a sensing unit.

FIG. 6 shows the configuration of the sensing units 20SE. A sensing unit 20SE detects the capacitance corresponding to the distance between the sensing unit 20SE and the electrode base member 22. The sensing unit 20SE includes a pulse electrode (first electrode) 21C and a sense electrode (second electrode) 21D. The pulse electrode 21C and the sense electrode 21D are designed to be capable of forming capacitive coupling. More specifically, the pulse electrode 21C and the sense electrode 21D each have a comb-like shape and are disposed so as to mesh with each other.

The pulse electrode 21C includes a plurality of sub electrodes $21C_1$ each having a linear shape. The sense electrode (second electrode) 21D includes a plurality of sub electrodes $21D_1$ each having a linear shape. The plurality of sub electrodes $21C_1$ and $21D_1$ is alternately arranged at constant intervals. Adjacent sub electrodes $21C_1$ and $21D_1$ are designed to be capable of forming capacitive coupling.

Since the sensing unit 20SE detects a pressure (capacitance) using the leakage electric field between the pulse electrode 21C and the sense electrode 21D, the pressure sensitivity varies with changes in the distance between the pulse electrode 21C and the sense electrode 21D, resulting in a decrease in reliability. Therefore, to prevent a decrease in reliability, the base member 21A of the sensor electrode layer 21 preferably includes a material having almost no elasticity.

A wiring line 21E is pulled out from the pulse electrode 21C, is extended to the trunk portion 21M, and is then connected to the connection terminals 20B through the connecting portion 20A. A wiring line 21F is pulled out from the sense electrode 21D, is extended to the trunk portion 21M, and is then connected to the connection terminals 20B through the connecting portion 20A.

The protective layer 21B is for protecting the sensing units 20SE. The protective layer 21B is an insulating film such as a coverlay film, or an insulating resist material, for example. Note that the sensor 20 may not include the protective layer 21B, and the adhesive layer 26A may be disposed directly on the one principal surface of the base member 21A on which the sensing units 20SE are disposed.

The sensor electrode layer 21 and the connecting portion 20A are preferably formed integrally with one flexible printed circuit board (hereinafter referred to as "FPC"). As the sensor electrode layer 21 and the connecting portion 20A are integrally formed in this manner, the number of components of the sensor 20 can be reduced. The durability against the impact of connection between the sensor 20 and the circuit board (not shown) can also be improved.

(Electrode Base Members)

Figure 7:
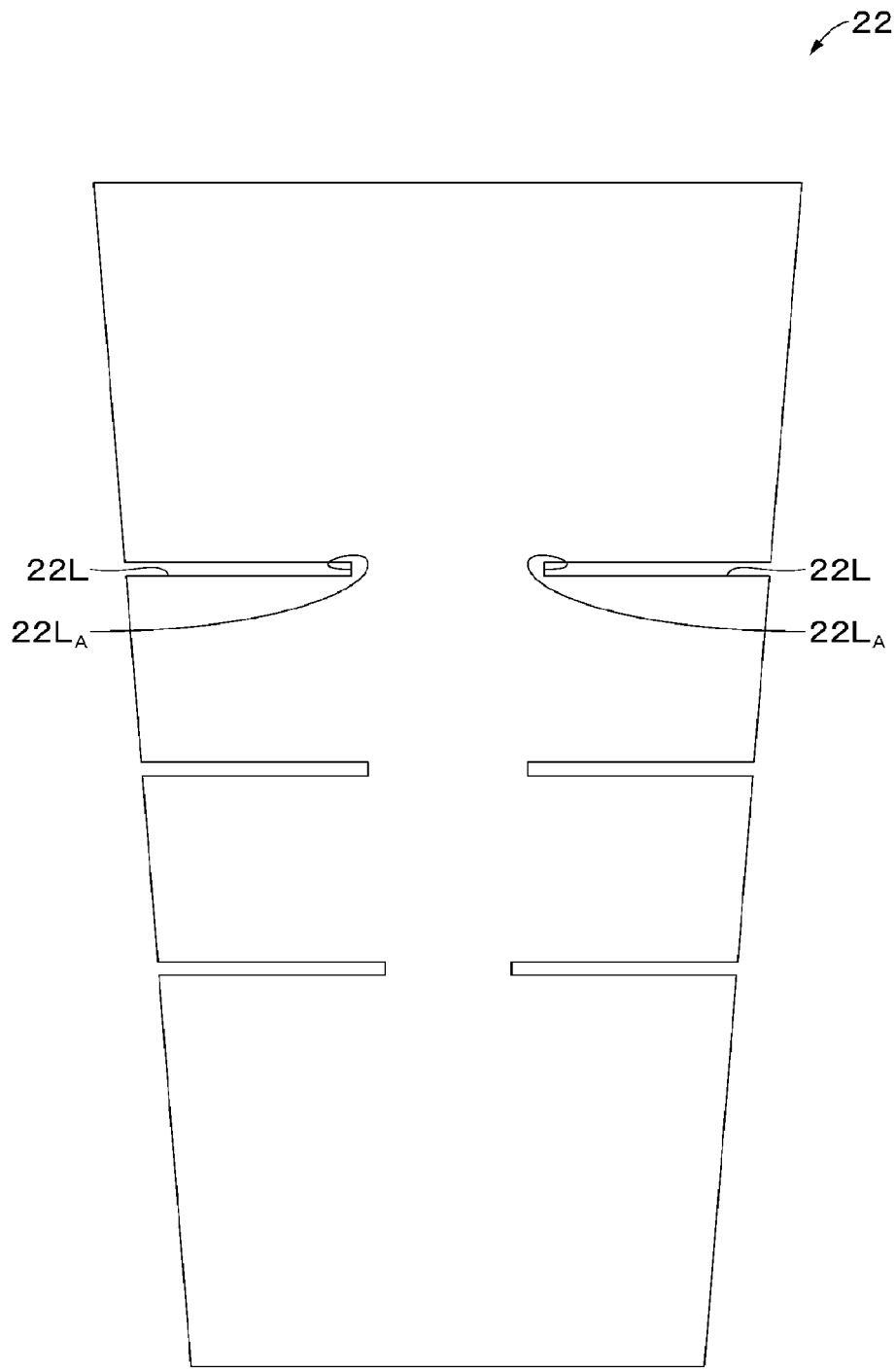
FIG. 7 is a plan view showing the shape of an electrode base member.

The electrode base members 22 and 23 are flexible electrode films. As shown in FIG. 7, the electrode base member 22 has a plurality of slits 22L. The electrode base member 22 has two side portions (two ends) facing each other, and the plurality of slits 22L extends inward from the two side portions facing each other. More specifically, the plurality of slits 22L extends linearly from the two side portions to the vicinity of the center line L of the electrode base member 22, for example. An R portion is preferably formed at the end $22L_A$ of each slit 22L, to prevent tearing of the electrode base member 22. Since the electrode base member 23 has a shape similar to that of the electrode base member 22, explanation of the shape of the electrode base member 23 is not made herein.

The extending direction of the slits 22L of the electrode base member 22 is preferably different from the extending direction of the slits 21L of the sensor electrode layer 21. For example, the extending direction of the slits 22L of the electrode base member 22 may be orthogonal to the extending direction of the slits 21L of the sensor electrode layer 21. Also, the extending direction of the slits (not shown) of the electrode base member 23 is preferably different from the extending direction of the slits 21L of the sensor electrode layer 21. For example, the extending direction of the slits 22L of the electrode base member 23 may be orthogonal to the extending direction of the slits 21L of the sensor electrode layer 21.

To reduce sensitivity variation among the plurality of sensing units 20SE, the slits 22L of the electrode base member 22 and the slits of the electrode base member 23 are preferably disposed so as not to overlap with any sensing unit 20SE in the thickness direction of the sensor 20. The electrode base members 22 and 23 may have elasticity. However, it is preferable to select a material whose resistance does not exceed $10\Omega/\square$ even when the electrode base members 22 and 23 are stretched. The plurality of slits 22L is preferably formed in accordance with the degree of elasticity of the electrode base members 22 and 23. The electrode base member 23 may be a metallic housing.

The electrode base member 22 includes a flexible base member 22A and a reference electrode layer (hereinafter referred to as "REF electrode layer") 22B provided on one principal surface of the base member 22A. The electrode base member 22 is disposed on one principal surface side of the sensor electrode layer 21 so that the REF electrode layer 22B faces the one principal surface of the sensor electrode layer 21. The electrode base member 23 includes a flexible base member 23A and a REF electrode layer 23B provided on one principal surface of the base member 23A. The electrode base member 23 is disposed on the other principal surface side of the sensor electrode layer 21 so that the REF electrode layer 23B faces the other principal surface of the sensor electrode layer 21.

The base members 22A and 23A each have a film-like shape. The materials of the base members 22A and 23A can be a polymer resin similar to that of the base member 21A, for example. The base members 22A and 23A may have elasticity. In this case, the material of the base members 22A and 23A can be a foamed resin, an insulating elastomer or the like.

The REF electrode layers 22B and 23B are so-called ground electrodes and have a ground potential. The shape of the REF electrode layers 22B and 23B may be a thin film-like shape, a foil-like shape, a mesh-like shape, or the like, for example, but is not limited to these shapes.

The REF electrode layers 22B and 23B are only required to have electrical conductivity, and may be an inorganic conductive layer containing an inorganic conductive material, an organic conductive layer containing an organic conductive material, an organic-inorganic conductive layer containing both an inorganic conductive material and an organic conductive material, or the like, for example. The inorganic conductive material and the organic conductive material may be particles. The REF electrode layers 22B and 23B may be conductive cloths. The REF electrode layers 22B and 23B may have elasticity.

Examples of the inorganic conductive material include metals and metal oxides. Here, the metals are defined to include semimetals. Examples of the metals include metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, and alloys and the like containing two or more of these metals. However, the inorganic conductive material is not limited to these metals. Specific examples of the alloys include stainless steel, but the inorganic conductive material is not limited to this. Examples of the metal oxides include indium tin oxides (ITO), zinc oxides, indium oxides, antimony-added tin oxides, fluorine-added tin oxides, aluminum-added zinc oxides, gallium-added zinc oxides, silicon-added zinc oxides, zinc oxides-tin oxides, indium oxides-tin oxides, and zinc oxides-indium oxides-magnesium oxides. However, the inorganic conductive material is not limited to these metal oxides.

Examples of the organic conductive material include carbon materials and conductive polymers. Examples of the carbon materials include carbon blacks, carbon fibers, fullerenes, graphenes, carbon nanotubes, carbon microcoils, and nanohorns. However, the organic conductive material is not limited to these carbon materials. Examples of the conductive polymers include substituted or unsubstituted polyanilines, polypyrroles, and polythiophenes. However, the organic conductive material is not limited to these conductive polymers.

The REF electrode layers 22B and 23B may be thin films produced by either a dry process or a wet process. The dry process may be a sputtering technique, a vapor deposition technique, or the like, for example, but the dry process is not particularly limited to these techniques.

As the electrode base members 22 and 23 are provided on the two principal surface sides of the sensor electrode layer 21, it is possible to prevent any external noise (any external electric field) from entering the sensor electrode layer 21 through the two principal surfaces of the sensor 20. Thus, it is possible to prevent a decrease in detection accuracy or false detection by the sensor 20 due to external noise.

(Elastic Layer)

The elastic layer 24 is designed to be elastically deformable by pressure applied to the surface of the sensor 30 at the side of the electrode base member 22. As the elastic layer 24 is interposed between the sensor electrode layer 21 and the electrode base member 22, the sensitivity and the dynamic range of the sensor 20 can be adjusted.

The elastic layer 24 may have a configuration that has a slit 24L or the like and is divided in the plane, or may have a configuration that has no slits 24L or the like and is not divided in the plane. The elastic layer 24 may be disposed on a support member, as needed. The material of the support member can be an insulating elastomer or the like, for example.

The elastic layer 24 contains a foamed resin, an insulating elastomer, or the like. The foamed resin is so-called sponge, and is at least one of the following materials: foamed polyurethane (polyurethane foam), foamed polyethylene (polyethylene foam), foamed polyolefin (polyolefin foam), foamed acrylic (acrylic foam), sponge rubber, and the like, for example. The insulating elastomer is at least one of the following elastomers: a silicone-based elastomer, an acrylic-based elastomer, a urethane-based elastomer, a styrene-based elastomer, and the like, for example.

(Gap Layer)

The gap layer 25 has insulating properties, and separates the electrode base member 23 and the sensor electrode layer 21 from each other. The thickness of the gap layer 25 adjusts the initial capacitance of the sensor 20. The gap layer 25 may or may not be elastically deformed by a pressure applied to the surface of the sensor 30 at the side of the electrode base member 22. In a case where the gap layer 25 is designed to be elastically deformable, the gap layer 25 may contain a foamed resin, an insulating elastomer, or the like. The gap layer 25 may have a configuration that has a slit 25L or the like and is divided in the plane, or may have a configuration that has no slits 25L or the like and is not divided in the plane.

The gap layer 25 may or may not have adhesiveness. In a case where the gap layer 25 has adhesiveness, the electrode base member 23 and the sensor electrode layer 21 are bonded to each other by the gap layer 25. The adhesive gap layer 25 is formed with a single-layer adhesive layer, or a stack structure (such as a double-sided adhesive film) that has adhesive layers provided on both surfaces of its base member, for example.

The adhesive contained in the above adhesive layer(s) can be at least one of the following adhesives: an acrylic adhesive, a silicone adhesive, and a urethane adhesive, for example. Note that, in the present disclosure, pressure sensitive adhesion is defined as a type of adhesion. According to this definition, an adhesive layer is considered a type of adhesive layer.

(Adhesive Layers)

The adhesive layers 26A, 26B, 27A, and 27B are formed with an insulating adhesive or double-sided adhesive films, for example. The adhesive can be similar to the adhesive of the gap layer 25 described above, for example.

[Sensor Bonding Methods]

Examples of methods for bonding the sensor 20 having the above configuration include: a method by which all the layers of the sensor 20 are bonded to one another on a flat surface, and the sensor 20 is then bonded to the curved surface 10S; a method by which the respective layers constituting the sensor 20 are bonded to the curved surface 10S one by one; and a method by which the layers constituting the sensor 20 are bonded in two or more times. To reduce the costs and the time required for manufacturing the electronic apparatus 10 including the sensor 20, it is preferable to reduce the number of times bonding is to be performed. However, in a case where all the layers of the sensor 20 are bonded at once, a higher tension is applied to an upper film. As a result, the elastic layer 24 might be crushed, and the sensitivity might drop. Therefore, to avoid a decrease in sensitivity of the sensor 20, it is preferable to bond the sensor 20 at least in two times, with the interface between the elastic layer 24 and the electrode base member 22 being the separation plane.

Examples of methods for bonding the sensor 20 to the curved surface 10S include a bonding method using a roller suitable for the curved surface 10S, and a bonding method using an airbag, a diaphragm, or the like including a rubber sheet. In particular, a vacuum bonding method using a transfer sheet that is used in decoration techniques is preferable.

Note that, at the time of bonding, the sensor 20 is bonded to the curved surface 10S, so that the plurality of slits 21L of the sensor electrode layer 21 extends in the longitudinal direction of the curved surface 10S, and the plurality of slits 22L of the electrode base member 22 and the plurality of slits (not shown) of the electrode base member 23 extend in the circumferential direction of the curved surface 10S, for example.

[Effects]

In the sensor 20 according to the first embodiment, the sensor electrode layer 21, the electrode base member 22, and the electrode base member 23 have slits. As a result, it is possible to prevent the formation of wrinkles when the sensor 20 is attached to the curved surface 10S having non-uniform curvature. Thus, the sensor 20 can be appropriately attached to a housing that may have any of various shapes other than a flat surface, without being restricted by the design of the housing, while the formation of wrinkles is prevented.

In a pressure sensor like the one disclosed in Patent Document 1, belt-like sensors need to be bonded to a curved surface one by one in a case where the sensor is used on the curved surface of an object such as an electronic apparatus. Therefore, it is difficult to mount a sensor onto a curved surface in that case. On the other hand, the sensor 20 according to the first embodiment is integrated as one structure, mounting the sensor 20 onto a curved surface can be facilitated. Furthermore, as the edge portions can be reduced, peeling, deterioration from the end faces, and the like can be reduced.

Since the positions and the orientations of the slits in the respective layers of the sensor 20 vary, the slit positions are not easily recognized by touch. Thus, the texture of the sensor 20 can be improved. In particular, in a case where the exterior member such as the housing is made softer so as to increase pressure sensitivity, the improvement in the texture of the sensor 20 becomes remarkable.

[Modifications]

(Modifications of the Elastic Layer)

The elastic layer 24 may be a porous layer. The porous layer is preferably a fiber layer. The fiber layer is a non-woven cloth or a woven cloth, for example. The fiber contained in the fiber layer may be nanofiber or thicker fiber than nanofiber. However, to increase the sensitivity of the sensor 20, nanofiber is preferable. The fiber may contain a polymer resin or may contain an inorganic material. However, to increase the sensitivity of the sensor 20, the fiber preferably contains a polymer resin.

The porous layer may include a three-dimensional structure (an irregular network structure such as a non-woven cloth) formed with a fibrous structure, and may be provided with a plurality of spaces (fine pores). As the porous layer includes a three-dimensional structure, a structure having a high porosity can be created, and thinning is easy.

The fibrous structure is a fibrous substance having a sufficient length with respect to the fiber size (diameter). For example, a plurality of fibrous structures is assembled and is randomly overlapped, to form the porous layer. One fibrous structure may be randomly entangled, to form the porous layer. Alternatively, a porous layer formed with one fibrous structure and a porous layer formed with a plurality of fibrous structures may coexist.

The fibrous structure extends linearly, for example. The fibrous structure may have any shape, and may be crimped or bent in the middle, for example. Alternatively, the fibrous structure may branch in the middle.

The minimum fiber diameter of the fibrous structure is preferably not greater than 500 nm, or more preferably, not greater than 300 nm. The mean fiber diameter is preferably not smaller than 0.1 µm and not greater than 10 µm, for example, but may be outside the above range. As the mean fiber diameter is made smaller, the pore diameter of the fine pores becomes larger. The mean fiber diameter can be measured by microscopic observation using a scanning electron microscope or the like, for example. The fibrous structure may have any appropriate mean length. The fibrous structure is formed by a phase separation method, a phase inversion method, an electrostatic (electric field) spinning method, a melt spinning method, a wet spinning method, a dry spinning method, a gel spinning method, a sol-gel method, a spray coating method, or the like, for example. By such a method, a fibrous structure having a sufficient length with respect to the fiber diameter can be easily and stably formed.

The fibrous structure includes a polymer material and/or an inorganic material. In particular, the fibrous structure is preferably formed with nanofiber. Here, the nanofiber is a fibrous substance having a fiber diameter that is not smaller than 1 nm and not greater than 1000 nm, and a length that is at least 100 times greater than the fiber diameter. As such nanofiber is used as the fibrous structure, the porosity can be made higher, and thinning becomes possible. The fibrous structure formed with nanofiber is preferably formed by an electrostatic spinning method. By an electrostatic spinning method, a fibrous structure having a small fiber diameter can be easily and stably formed.

(Modification of the Adhesive Layers)

The adhesive layers 26A and 26B may have conductivity. In this case, the sensitivity of the sensor 20 can be further increased. The conductive adhesive layers 26A and 26B further contain a conductive material in addition to the adhesive. The conductive material is a conductive filler and/or a conductive polymer, for example. The conductive filler contains at least one of the following materials: a carbon filler, a metal filler, a metal oxide filler, and a metal-coated filler, for example. Here, metals are defined to include semimetals. Note that the adhesive layers 27A and 27B may have conductivity.

(Modification of the Electrode Base Members)

The base member 22A may not be included. That is, the sensor 20 may include the REF electrode layer 22B in place of the electrode base member 22. Likewise, the base member 23A may not be included. That is, the sensor 20 may include the REF electrode layer 23B in place of the electrode base member 23.

Figure 8:
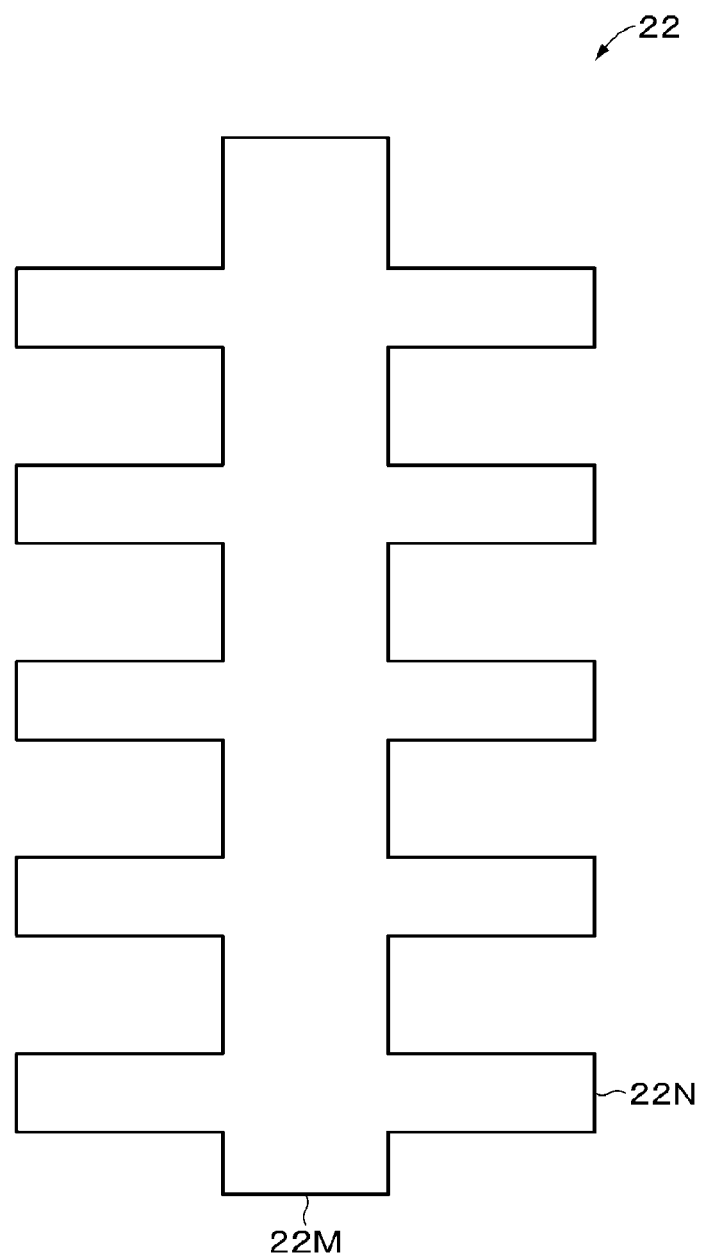
FIG. 8 is a plan view of a modification of an electrode base member.

As shown in FIG. 8, the electrode base member 22 includes a trunk portion 22M and a plurality of branch portions 22N extending like branches from the trunk portion 22M. Space (gaps) having a predetermined width is provided between the adjacent branch portions 22N. The electrode base member 23 may have a shape similar to that of the electrode base member 22 described above.

(Examples of Electronic Apparatuses)

The present disclosure can be applied to various kinds of electronic apparatuses each including an exterior member such as a housing having a curved surface. In particular, the present disclosure is preferably applied to an electronic apparatus including an exterior member such as a housing having a curved surface with non-uniform curvature. For example, the present disclosure can be applied to personal computers, mobile phones such as smartphones, television receivers, remote controllers, cameras, game devices, navigation systems, electronic books, electronic dictionaries, portable music players, keyboards, wearable terminals, radios, stereos, medical devices, robots, and the like.

Examples of the wearable terminals include smart watches, head mound displays, wristbands, rings, eyeglasses, shoes, and clothing.

(Examples Other Than Electronic Apparatuses)

The present disclosure is not limited to electronic apparatuses, and can be applied to various kinds of apparatuses other than electronic apparatuses. In particular, the present disclosure is preferably applied to an apparatus including an exterior member such as a housing having a curved surface with non-uniform curvature. For example, the present disclosure can be applied to electric apparatuses such as electric tools, refrigerators, air conditioners, water heaters, microwave ovens, dishwashers, washing machines, dryers, lighting devices, and toys. Further, the present disclosure can be applied to architectural structures such as residential houses, architectural members, transportation means, furniture such as tables and desks, manufacturing equipment, analytical equipment, and the like. Examples of the architectural members include paving stones, wall materials, floor tiles, and floor boards. Examples of the transportation means include vehicles (such as automobiles and motorcycles), ships, submarines, railroad vehicles, aircraft, spacecraft, elevators, and playground equipment.

2 Second Embodiment

[Configuration of the Sensor]

Figure 9A:
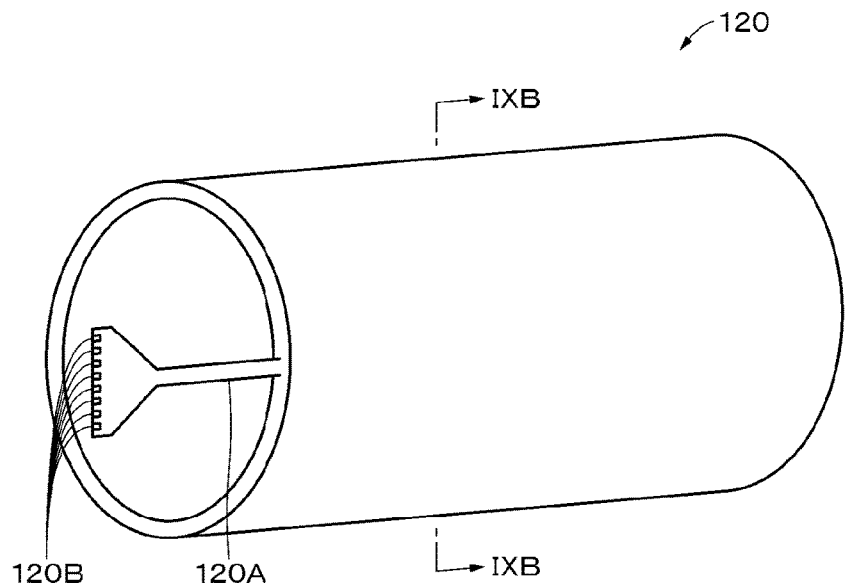
FIG. 9A is a perspective view showing the configuration of a sensor according to a second embodiment of the present disclosure.

FIG. 9A shows the configuration of a sensor 120 according to a second embodiment of the present disclosure. The sensor 120 has a tubular shape, and a film-like connecting portion 120A extends from one end of the sensor 120. The sensor 120 has elasticity, and is attached to an adherend 110 having a cylindrical surface 110S, as shown in FIG. 13B. A plurality of connection terminals 120B for connecting to the main body of the adherend 110 is provided at the tip of the connecting portion 120A. The connection terminals 120B are connected to a connection terminal (not shown) provided in a recess 111 of the cylindrical surface 110S. The adherend 110 is part of an electronic apparatus such as a robot, for example. Further, the adherend 110 is not necessarily an electronic apparatus, and may be a handlebar of a bicycle, a tennis racket, or the like.

Figure 9B:
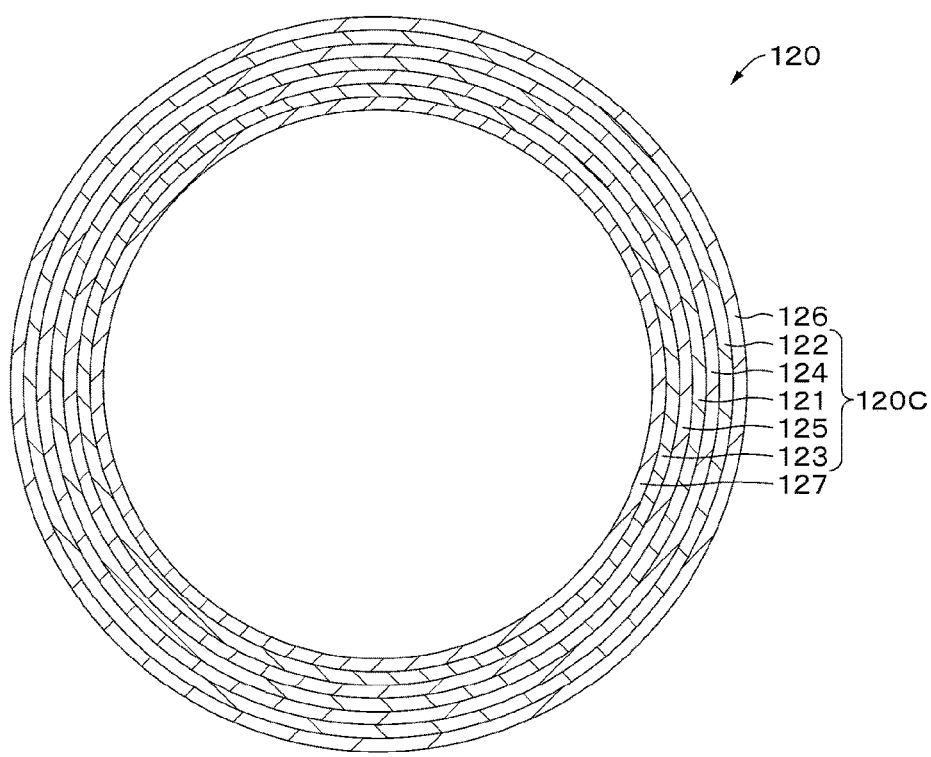
FIG. 9B is a cross-sectional view taken along the IXB-IXB line defined in FIG. 9A.

FIG. 9B is a cross-sectional view taken along the IXB-IXB line defined in FIG. 9A. The sensor 120 includes a tubular sensor main frame 120C, an elastomer layer 126 provided on the outer peripheral surface of the sensor main frame 120C, and an elastomer layer 127 provided on the inner peripheral surface of the sensor main frame 120M. A case where the sensor 120 includes both elastomer layers 126 and 127 is explained herein, but the sensor 120 may include only one of the elastomer layers 126 and 127. Note that, in the second embodiment, components similar to those of the first embodiment are denoted by the same reference numerals as those used in the first embodiment, and explanation of them is not repeated herein.

(Sensor Main Frame)

The sensor main frame 120C is a rectangular film that is rolled into a tubular shape, and has elasticity. The sensor main frame 120C includes a plurality of sensing units 20SE. The sensor main frame 120C differs from the sensor 20 of the first embodiment in having a rectangular shape. More specifically, the sensor main frame 120C has a configuration in which an electrode base member 123, an elastic layer 125, a sensor electrode layer 121, an elastic layer 124, and an electrode base member 122 are stacked in this order in the direction from the inner periphery toward the outer periphery. Adhesive layers are provided between these layers as needed. The electrode base member 123, the elastic layer 125, the sensor electrode layer 121, the elastic layer 124, and the electrode base member 122 each have a rectangular shape.

(Sensor Electrode Layer)

FIG. 10 shows the shape of the sensor electrode layer 121. The sensor electrode layer 121 includes a comb-like first region $R_1$ provided with a plurality of slits $21L_1$, and a comb-like second region $R_2$ provided with a plurality of slits $21L_2$. The orientations of the plurality of slits $21L_1$ in the first region and the plurality of slits $21L_2$ in the second region (the orientations of the cuts) are the opposite to each other. More specifically, the plurality of slits $21L_1$ extends linearly from one end to the vicinity of the other end of the sensor electrode layer 121. Also, the plurality of slits $21L_2$ extends linearly from the other end to the vicinity of the one end of the sensor electrode layer 121. The extending direction of the plurality of slits $21L_1$ and the plurality of slits $21L_2$ coincides with the height direction of the tubular sensor 120.

The sensor electrode layer 121 may have elasticity. However, the sensor electrode layer 121 preferably has no elasticity or has almost no elasticity. As the sensor electrode layer 121 has no elasticity or has almost no elasticity, changes in the distance between the pulse electrode 21C and the sense electrode 21D are reduced, and accordingly, changes in pressure sensitivity can be reduced. Thus, a decrease in reliability can be prevented.

(Electrode Base Members)

Figure 11:
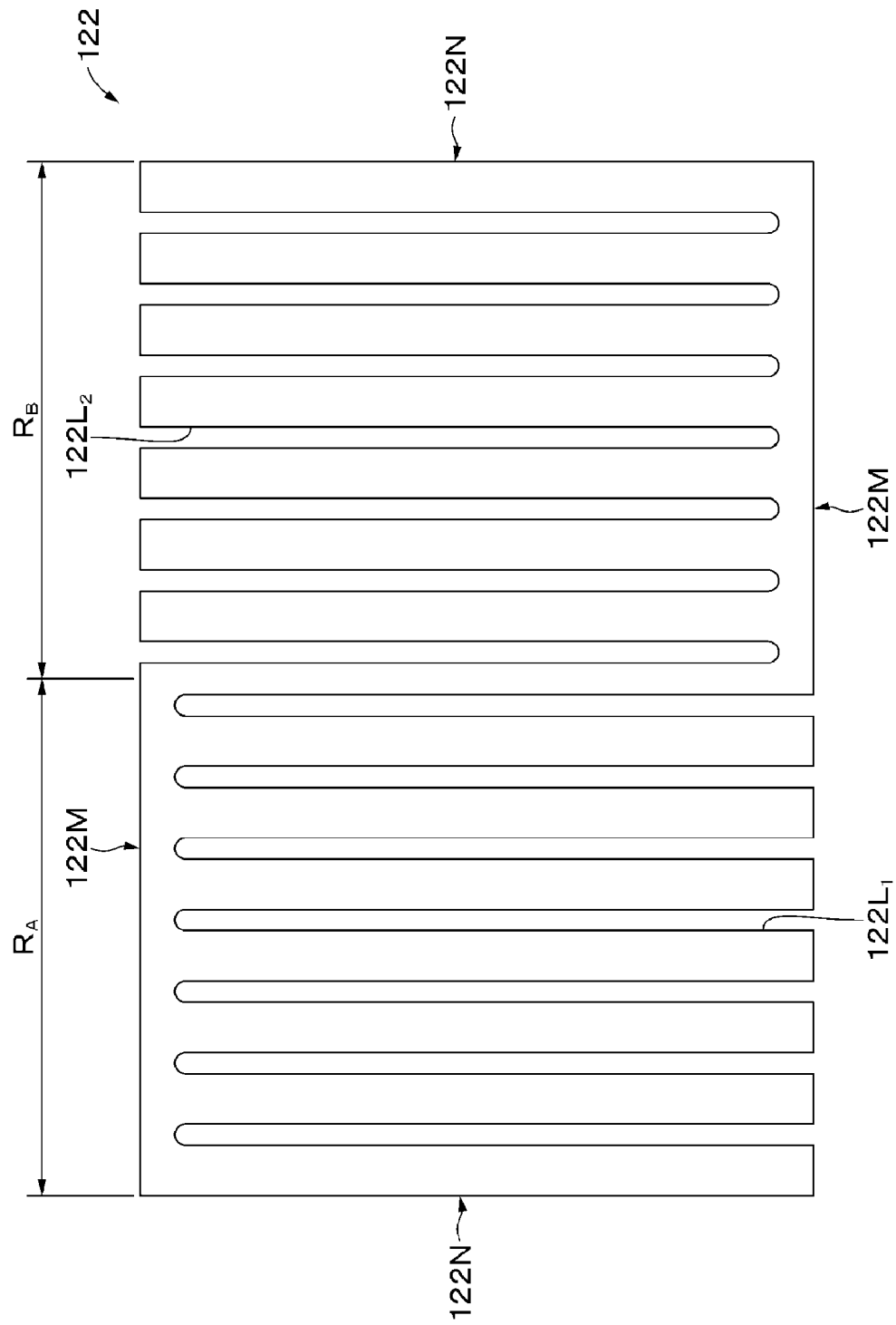
FIG. 11 is a plan view showing the shape of an electrode base member.

FIG. 11 shows the shape of the electrode base member 122. The electrode base member 122 includes a comb-like first region $R_A$ provided with a plurality of slits $122L_1$, and a comb-like second region $R_B$ provided with a plurality of slits $122L_2$. The slits $122L_1$ and $122L_2$ are similar to the slits $21L_1$ and $21L_2$ of the sensor electrode layer 121, respectively. However, the slits $122L_1$ and $122L_2$ of the electrode base member 122 may differ from the slits $21L_1$ and $21L_2$ of the sensor electrode layer 121 in shape and/or extending direction.

Since the electrode base member 123 has a shape similar to that of the electrode base member 122, explanation of the shape of the electrode base member 123 is not made herein. However, the shapes of the electrode base member 122 and the electrode base member 123 may differ from each other. The electrode base members 122 and 123 each include a base member and a REF electrode layer disposed on one principal surface of the base member. The base member and the REF electrode layer are similar to the base member 22A and the REF electrode layer 22B of the first embodiment, respectively. Instead of the plurality of slits $122L_1$ and $122L_2$, the electrode base members 122 and 123 may have elasticity. The electrode base members 122 and 123, as well as the plurality of slits $122L_1$ and $122L_2$, may have elasticity. The plurality of slits $122L_1$ and $122L_2$ of the electrode base member 122 may overlap the slits $21L_1$ and $21L_2$ of the sensor electrode layer 121 in the thickness direction of the sensor 120.

(Elastic Layers)

The elastic layers 124 and 125 are similar to the elastic layer 24 of the first embodiment, except for the shape.

(Elastomer Layers)

The elastomer layers 126 and 127 each have a tubular shape, and a sensor main frame 120C is disposed between the elastomer layers 126 and 127. The elastomer layers 126 and 127 have elasticity. The elastomer layers 126 and 127 contain silicone resin, polyurethane, nitrile rubber, or the like, for example.

[Sensor Manufacturing Method]

Figure 12:
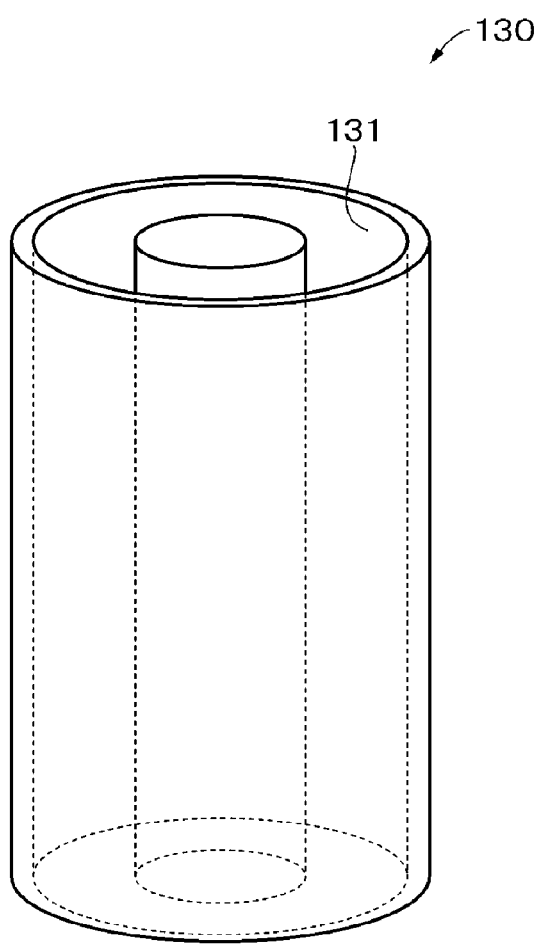
FIG. 12 is a perspective view showing the configuration of a mold.

The sensor 120 having the above configuration is manufactured as follows. First, the sensor main frame 120C is wound around a rod-like shaft, for example, to form the tubular shape. A mold 130 having a cylindrical space 131 shown in FIG. 12 is then prepared. The tubular sensor main frame 20C is then dropped into the space 131 of the mold 130. A molten resin material is poured into the space 131, and the resin material is cured. After that, the manufactured sensor 20 is taken out from the space 131 of the mold 130.

[Sensor Attaching Method]

Figure 13A:
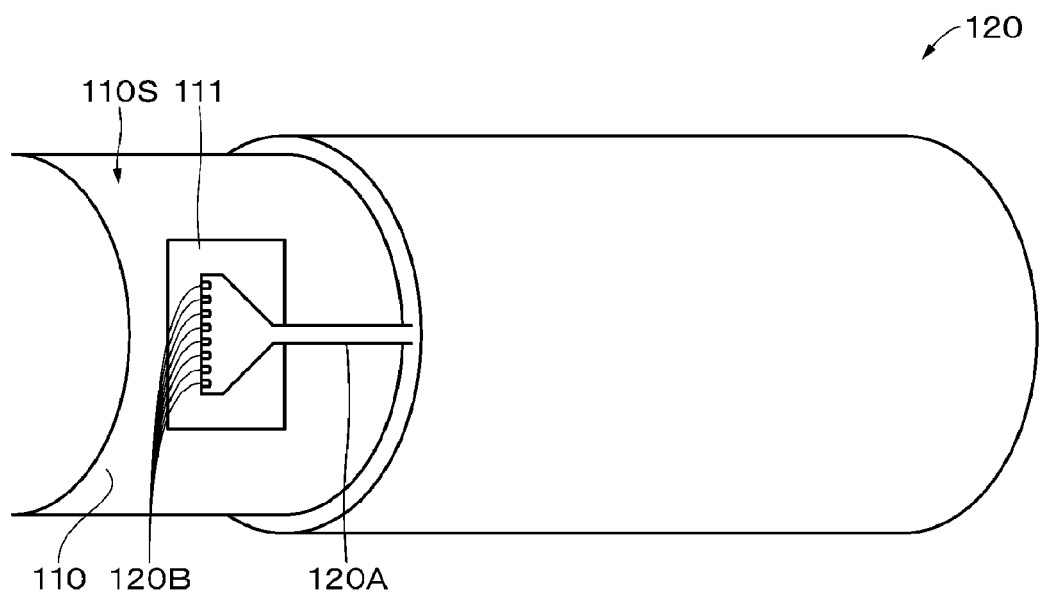
FIGS. 13A and 13B are perspective views each for explaining a sensor mounting method.
Figure 13B:
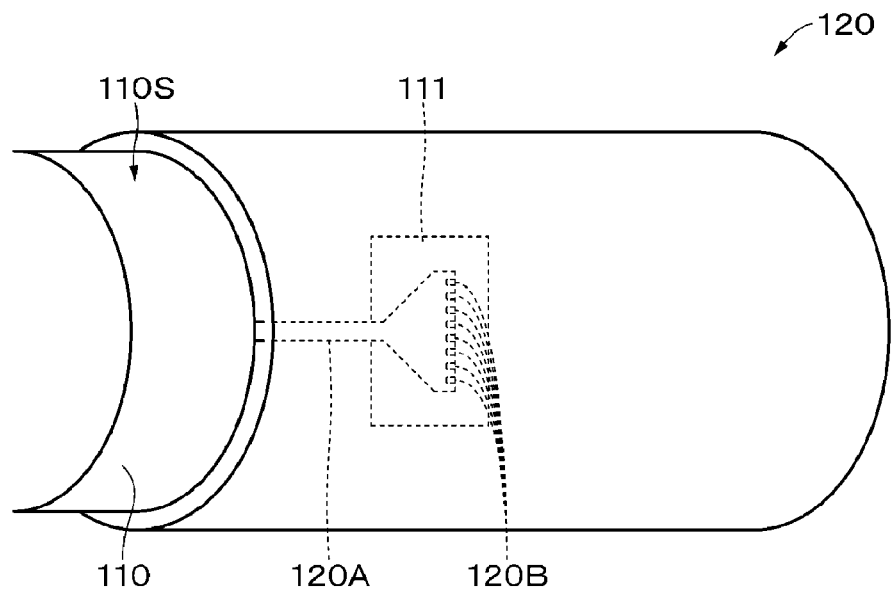

Referring now to FIGS. 13A and 13B, a method for attaching the sensor 120 having the above configuration is described. First, as shown in FIG. 13A, the tubular sensor 120 is inserted into the cylindrical surface 110S of the adherend 110 while being extended and widened, so that the sensor 120 is attached to the cylindrical surface 110S of the adherend 110. At this stage, the recess 111 formed in the cylindrical surface 110S is not covered with the sensor 120. The connection terminals 120B of the sensor 120 are then connected to the connection terminal disposed in the recess 111. After that, the sensor 120 is further inserted into the cylindrical surface 110S of the adherend 110 so as to cover the recess 111 while being pushed, extended, and widened again, as shown in FIG. 13B. At this stage, the connecting portion 120A is folded back and is accommodated between the inner side surface of the sensor 120 and the cylindrical surface 110S of the adherend 110. Note that a recess (not shown) for accommodating the connecting portion 120A may be formed in the cylindrical surface 110S.

[Effects]

As described above, in the sensor 120 according to the second embodiment, the sensor electrode layer 121, the electrode base member 122, and the electrode base member 123 each have a plurality of slits, and the extending direction of the slits coincides with the height direction of the tubular sensor 120. With this arrangement, the sensor electrode layer $121_1$ can be stretched together with the elastomer layers 126 and 127 and the like in the circumferential direction of the tubular sensor 120. Accordingly, the tubular sensor 120 can be extended so as to widen its through hole, and be inserted into the cylindrical surface 110S of the adherend 110. Thus, the sensor 120 can be easily attached to the adherend 110.

Further, having a tubular shape and elasticity, the sensor 120 according to the second embodiment can be easily attached to and detached from the adherend 110. For example, the sensor 120 can be easily attached to a handlebar of a bicycle, a tennis racket, or the like.

Furthermore, in a case where a rectangular film-like sensor is wound around the cylindrical surface 110S, an edge is invariably present on the cylindrical surface 110S, and a problem such as the sensor coming off from the edge occurs. On the other hand, the sensor 120 according to the second embodiment has a seamless shape. Accordingly, there are no edges existing on the cylindrical surface 110S, and there will be no problems such as the sensor coming off from an edge like a rectangular film-like sensor.

Further, the sensor 120 is attached to the cylindrical surface 110S of the adherend 110 while being extended and widened. Accordingly, even if the cylindrical surface 110S has small irregularities or a gentle curvature, the sensor 120 can be made to conform to these shapes.

[Modifications]

(First Modification)

Figure 14:
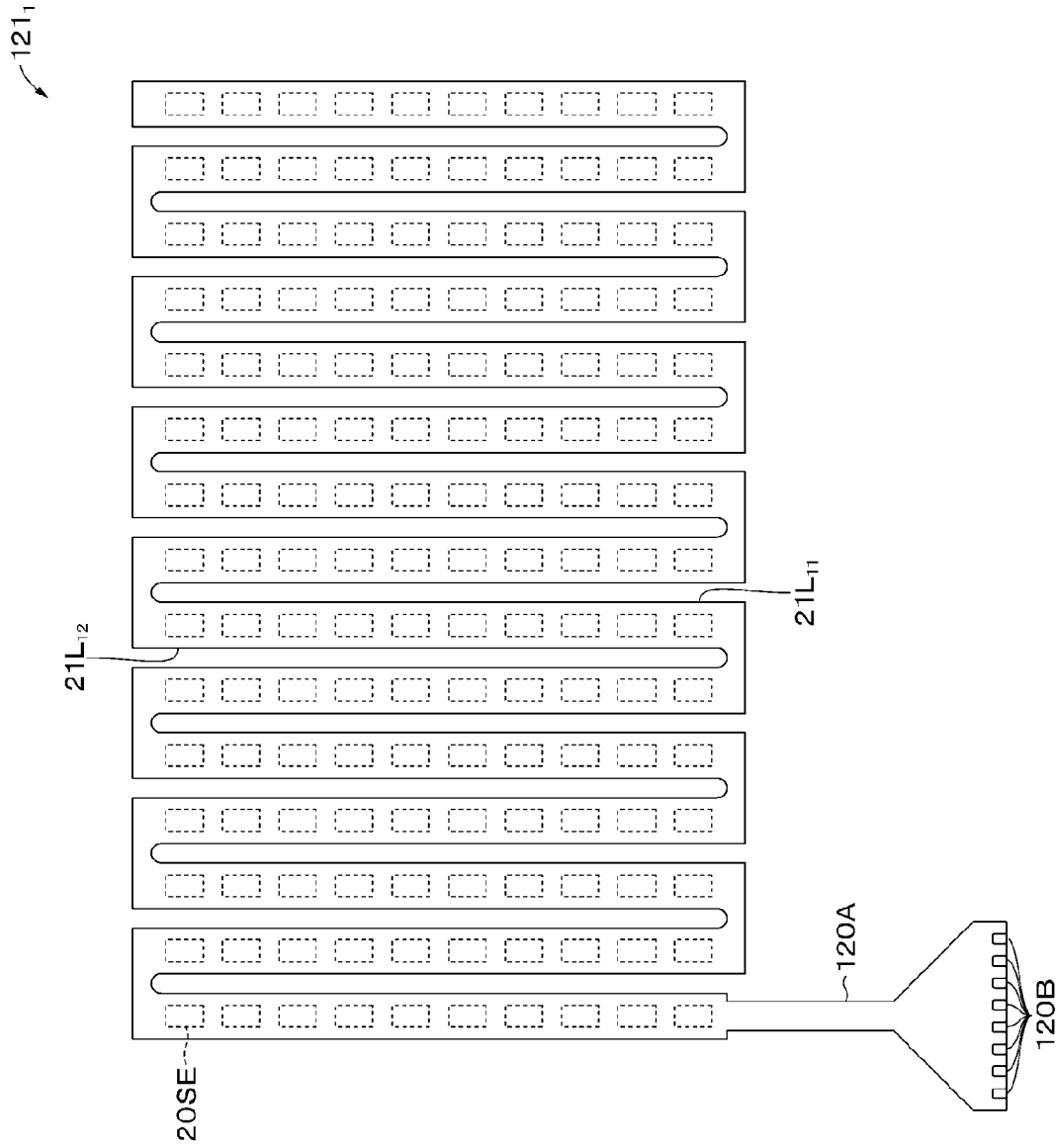
FIG. 14 is a plan view showing the shape of a sensor electrode layer according to a first modification.

FIG. 14 shows the shape of a sensor electrode layer $121_1$ according to a first modification. The sensor electrode layer $121_1$ has a meander shape, and the orientations of adjacent slits $21L_1$ and $21L_2$ (the orientations of notches) are the opposite to each other. In this case, the sensor electrode layer $121_1$ can also be stretched together with the elastomer layers 126 and 127 and the like in the circumferential direction of the tubular sensor 120. Note that each of the electrode base members 122 and 123 may have a meander shape like the sensor electrode layer $121_1$ described above.

(Second Modification)

Figure 15:
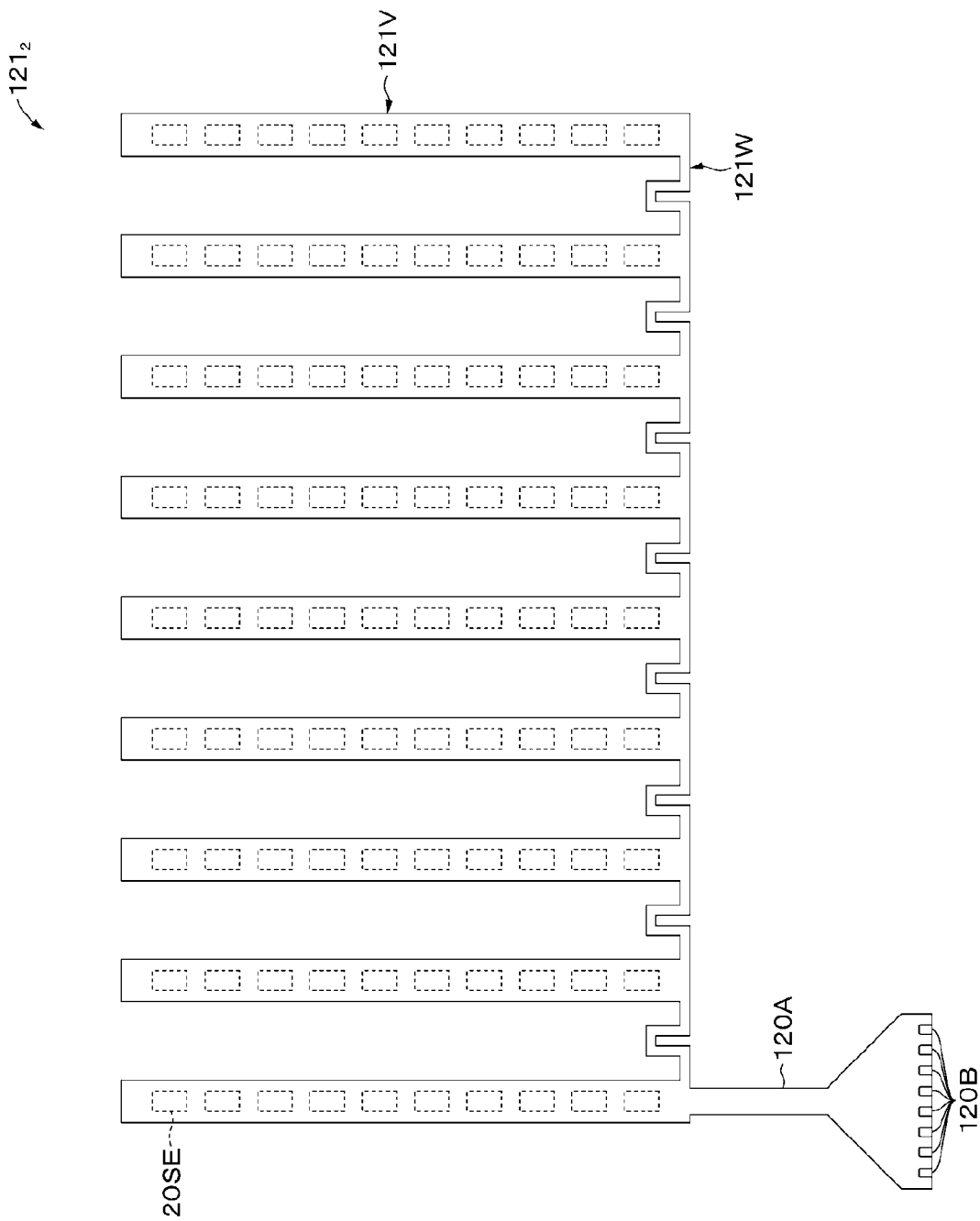
FIG. 15 is a plan view showing the shape of a sensor electrode layer according to a second modification.

FIG. 15 shows the shape of a sensor electrode layer $121_2$ according to a second modification. The sensor electrode layer $121_2$ includes a plurality of linear sensor units 121V arranged in a striped manner, and a plurality of meander wiring units 121W that connect the adjacent sensor units 121V to one another. The sensor electrode layer $121_2$ is provided in the sensor 120 so that the longitudinal direction of the linear sensor units 121V and the height direction of the tubular sensor 120 coincide with each other. A plurality of sensing units 20SE arranged in a line is provided in each of the sensor units 121V, and the wiring lines (not shown) drawn from the respective sensing units 20SE are connected to the connection terminals 120B via the meander wiring units 121W and the connecting portion 120A.

Figure 16:
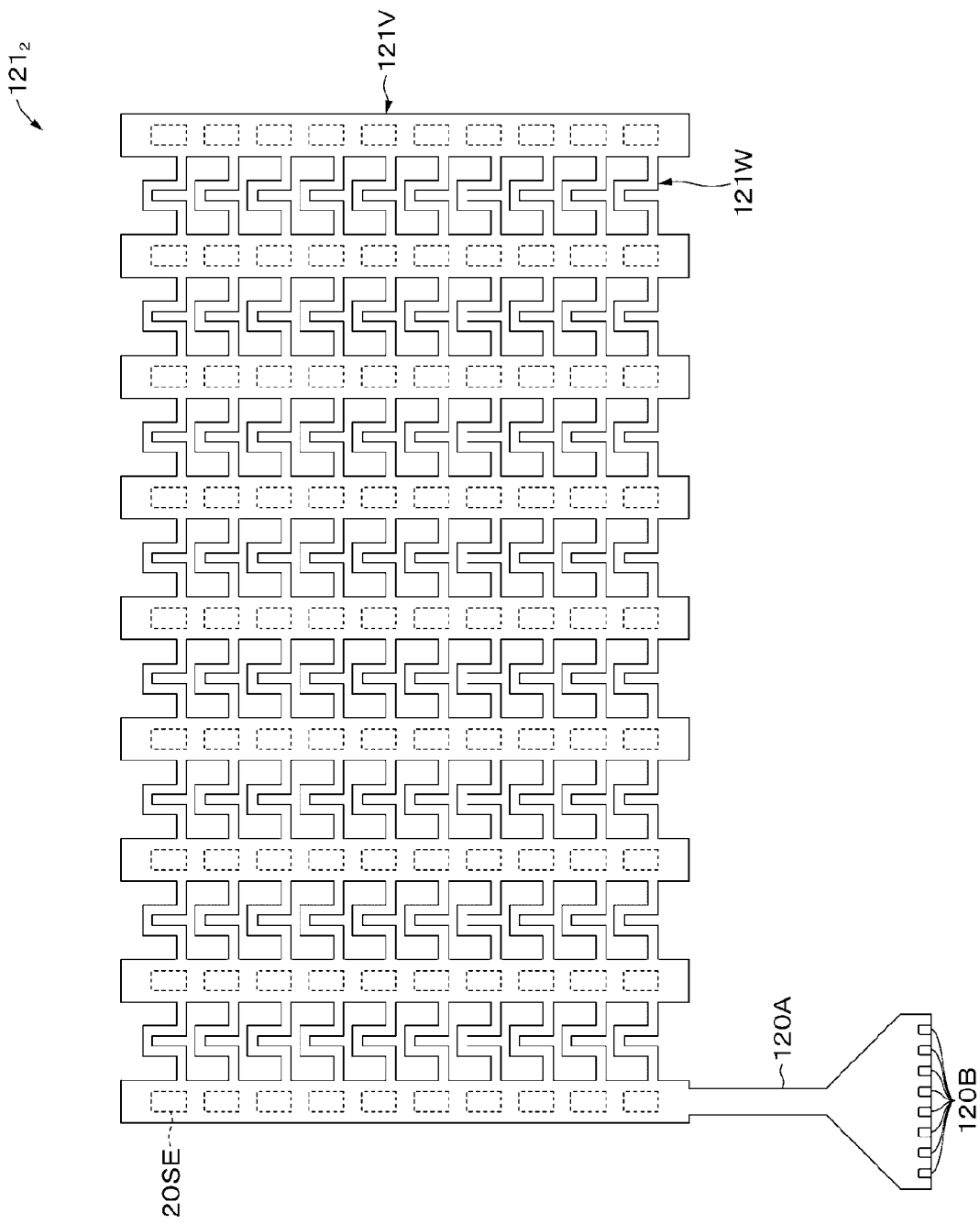
FIG. 16 is a plan view showing the shape of a sensor electrode layer according to the second modification.

FIG. 15 shows an example in which two adjacent sensor units 121V are connected by one meander wiring unit 121W. However, as shown in FIG. 16, two adjacent sensor units 121V may be connected by a plurality of meander wiring units 121W. In this case, the same number of meander wiring units 121W as the sensing units 20SE provided in the sensor units 121V may be disposed between the adjacent sensor units 121V, and the respective sensing units 20SE of the adjacent sensor units 121V may be connected by the meander wiring units 121W. Note that each of the electrode base members 122 and 123 may have a striped shape like the sensor electrode layer $121_2$ described above. In this case, the striped sensor units 121V are disposed so as to overlap the striped electrode base members 122 and 123 in the thickness direction of the sensor 120.

(Third Modification)

Figure 17A:
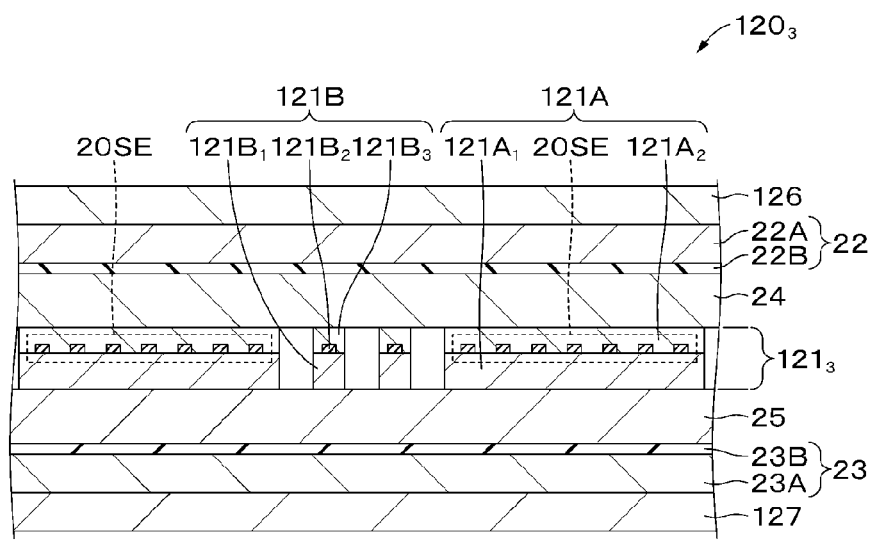
FIG. 17A is a cross-sectional diagram showing the configuration of a sensor according to a third modification.
Figure 17B:
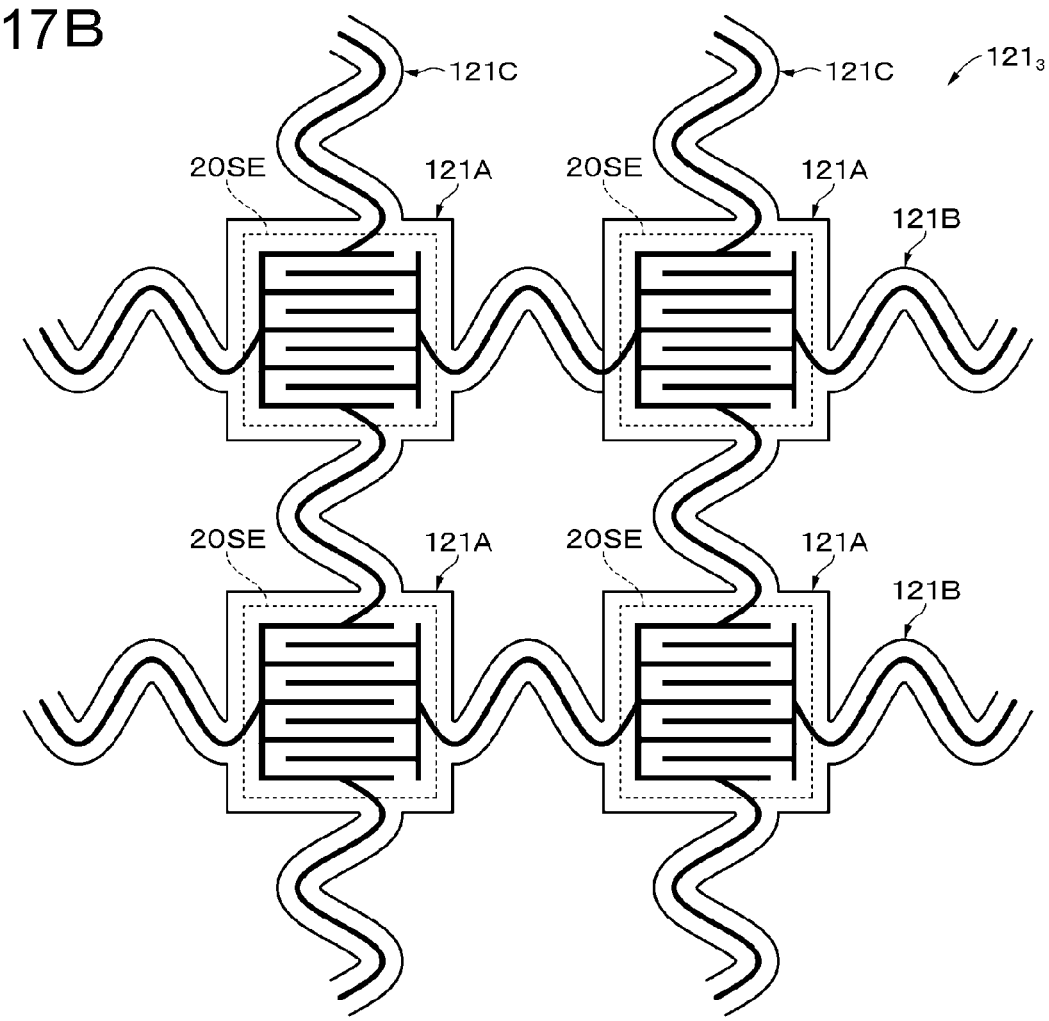
FIG. 17B is a plan view showing the configuration of a sensor electrode layer shown in FIG. 17A.

FIG. 17A shows the configuration of a sensor $120_3$ according to a third modification. FIG. 17B shows the configuration of a sensor electrode layer $121_3$ shown in FIG. 17A. The sensor $120_3$ differs from the sensor 120 of the second embodiment in that the sensor electrode layer $121_3$ is provided in place of the sensor electrode layer 121.

The sensor electrode layer $121_3$ includes: a plurality of sensor units 121A that are arranged in a matrix and include sensing units 20SE; a plurality of meander wiring units 121B that connect the sensor units 121A adjacent to one another in the height direction of the sensor $120_3$; and meander wiring units 121C that connect the sensor units 121A adjacent to one another in the circumferential direction of the sensor $120_3$. The sensor units 121A each include a base member $121A_1$, the sensing units 20SE disposed on the base member $121A_1$, and a protective layer $121A_2$ that covers one principal surface of the base member $121A_1$ provided with the sensing units 20SE. The meander wiring units 121B each include a base member $121B_1$, a wiring line $121B_2$ disposed on the base member $121B_1$, and a protective layer $121B_3$ that covers one principal surface of the base member $121B_1$ provided with the wiring line $121B_2$. The meander wiring units 121C each have a configuration similar to that of the meander wiring units 121B.

In the sensor $120_3$ having the above configuration, the sensor electrode layer $121_3$ can be stretched together with the elastomer layers 126 and 127 and the like in both the circumferential direction and the height direction of the tubular sensor 120. Thus, the sensor $120_3$ can be attached to adherends having various shapes. Note that each of the electrode base members 122 and 123 may have a shape similar to that of the sensor units 121A described above. In this case, the sensor units 121A are disposed so as to overlap the electrode base members 122 and 123 in the thickness direction of the sensor 120₃.

EXAMPLES

In the description below, the present disclosure will be specifically explained by way of examples. However, the present disclosure is not limited only to these examples.

Example 1

First, the respective components listed below were stacked, to form trapezoidal film-like sensors 20 having the configurations shown in FIGS. 2 to 4. Note that the base members 22A and 23A were not used in this configuration.
  REF electrode layer 22B: a conductive cloth
  Elastic layer 24: a sponge sheet without a base member
  Sensor electrode layer 21: FPC (the size of each sensing unit 20SE: about 3 mm×6 mm)
  Gap layer 25: a sponge sheet without a base member
  REF electrode layer 23B: a conductive cloth
[Measurement of Load Sensitivity Curves]

Figure 18:
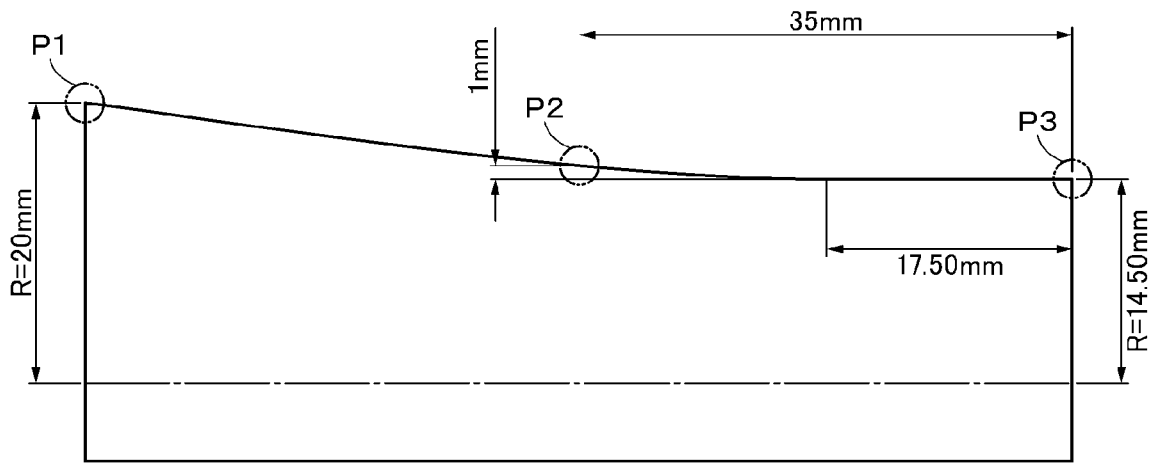
FIG. 18 is a side view showing the shape of an adherend.

First, three sensors 20 of Example 1 were prepared, and each of the sensors 20 was bonded to an ABS resin adherend having a quadric surface as shown in FIG. 18, to prepare three curved surface samples. Note that a quadric curve is a curve in which three positions P1 to P3 shown in FIG. 18 are designated. Next, a load of 20 to 500 gf was applied to the center line L of each sensor 20 (see FIG. 2) at intervals of 1 mm, the output values of ten sensing units 20SE were measured, and the largest value among the measured values was defined as delta. The results are shown in Table 1 and FIG. 19. Note that an artificial finger formed with R5-mm silicone rubber was used as a keystroker for applying a load.

Further, one sensor 20 of Example 1 was prepared and was attached to a flat plate, to prepare one flat surface sample. Measurement similar to that described above was then conducted. The results are shown in Table 1 and FIG. 19.
[400 gf Sensitivity Distributions]

Figure 20:
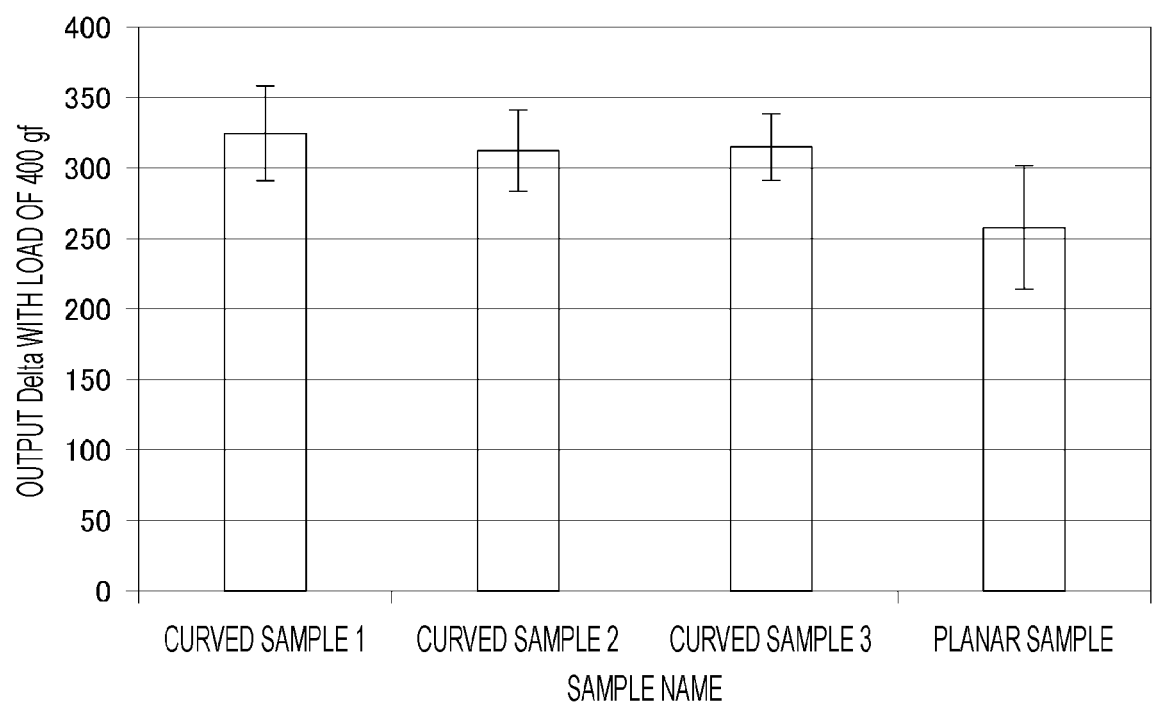
FIG. 20 is a graph showing the results of evaluation of 400 gf sensitivity distributions.

First, three curved surface samples were prepared in a manner similar to that in the measurement of load sensitivity curves described above. Next, a load of 400 gf was measured in the circumferential direction DA (see FIGS. 2 and 3) at intervals of five degrees, and the largest value among the measured values was defined as delta. This measurement was performed while being shifted in the axial DB (see FIG. 2 and FIG. 3) at intervals of 6 mm, and the output values of all 70 sensing units 20SE were measured. The results are shown in Table 2 and FIG. 20. Note that an artificial finger formed with R5-mm silicone rubber was used as a keystroker for applying a load, as in the measurement of load sensitivity curves described above.

Further, one sensor 20 of Example 1 was prepared and was attached to a flat plate, to prepare one flat surface sample. Measurement similar to that described above was then conducted. The results are shown in Table 2 and FIG. 20.

Table 1 shows the results of the measurement of load sensitivity curves.

TABLE 1

| Load [gf] | Planar sample delta | Curved sample delta (Number of samples: 3) | Individual difference in curved sample delta (max − min) |
|---|---|---|---|
| 20 | 9 | 10 | 3 |
| 50 | 22 | 32 | 8 |
| 100 | 50 | 72 | 21 |
| 200 | 114 | 166 | 32 |
| 300 | 178 | 247 | 37 |
| 400 | 234 | 314 | 46 |
| 500 | 285 | 366 | 40 |

Table 2 shows the results of the measurement of 400 gf sensitivity distributions.

TABLE 2

| Sample name | Output In-plane mean value | Variation In-plane max value − min value | Range/mean value [%] |
|---|---|---|---|
| Curved sample 1 | 324.8 | 66 | 20 |
| Curved sample 2 | 312.7 | 57 | 18 |
| Curved sample 3 | 315.2 | 48 | 15 |
| Planar sample | 258.2 | 88 | 34 |

Figure 19:
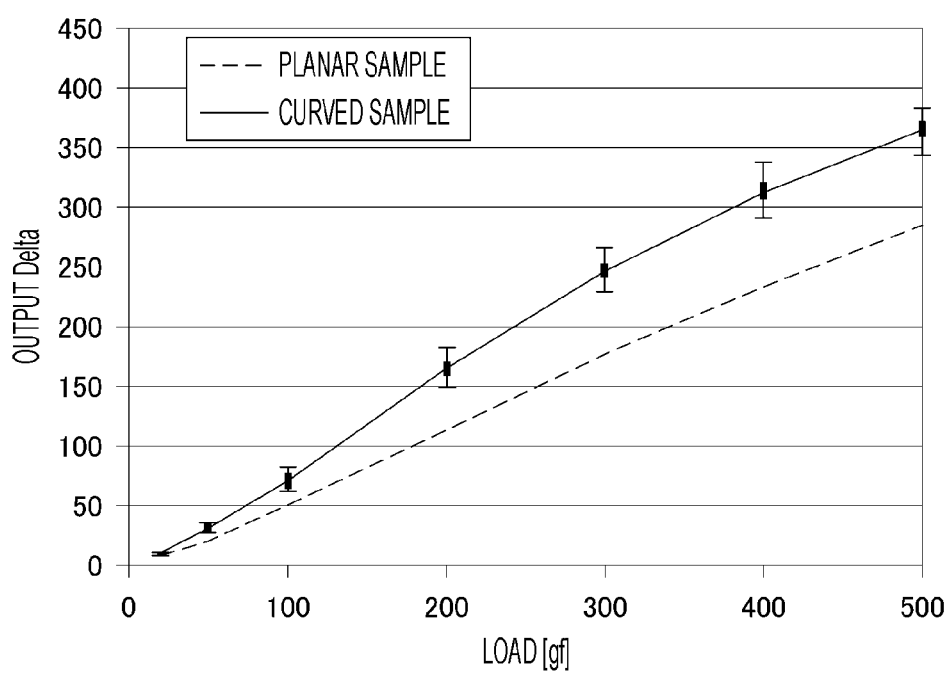
FIG. 19 is a graph showing load sensitivity curves.

As can be seen from the evaluation results shown in Table 1 and FIG. 19, each curved surface sample has a higher sensitivity than the flat surface sample. Further, as can be seen from the evaluation results shown in Table 2 and FIG. 20, the variation in sensitivity of the curved surface samples is equal to or smaller than that with flat surface sample.

Examples 2 to 6

First, ABS resin adherends each having a curved surface with a Gaussian curvature as shown in FIGS. 21A to 21C, 22A, and 22B were prepared. Next, a compact multifunctional vacuum/compressed air forming machine (KFS, manufactured by Asano Laboratories Co., Ltd.) was used, to bond the respective layers listed below sequentially to the curved surface of each prepared adherend. In this manner, trapezoidal film-like sensors 20 having the configuration shown in FIGS. 2 and 4 were manufactured. Note that, every time the respective layers were bonded, the surfaces of the bonded respective layers were visually observed, so that the presence or absence of wrinkles was checked. The results are shown in Table 3.
  Electrode base member 22: an elastomer film with a Cu layer formed by vapor deposition
  Elastic layer 24: a sponge sheet without a base member
  Sensor electrode layer 21: FPC (the size of each sensing unit 20SE: about 3 mm×6 mm)
  Gap layer 25: a sponge sheet without a base member
  Electrode base member 23: a PET film with an Al layer formed by vapor deposition Examples 7 to 11

First, the respective layers were stacked beforehand on a flat surface, to form sensors 20 having the configuration shown in FIGS. 2 and 4. Note that the configurations of the respective layers were similar to those of Examples 2 to 6 described above. ABS resin adherends each having a curved surface with a Gaussian curvature as shown in FIGS. 21A to 21C, 22A, and 22B were then prepared. Next, a compact multifunctional vacuum/compressed air forming machine (KFS, manufactured by Asano Laboratories Co., Ltd.) was used, to bond the sensors 20 to the curved surfaces of the respective prepared adherends. After the bonding, the surfaces of the sensors 20 were visually observed, so that the presence or absence of wrinkles was checked. The results are shown in Table 4.

Table 3 shows the results of evaluation of the sensors of Examples 2 to 6.

TABLE 3

Figure 21A:
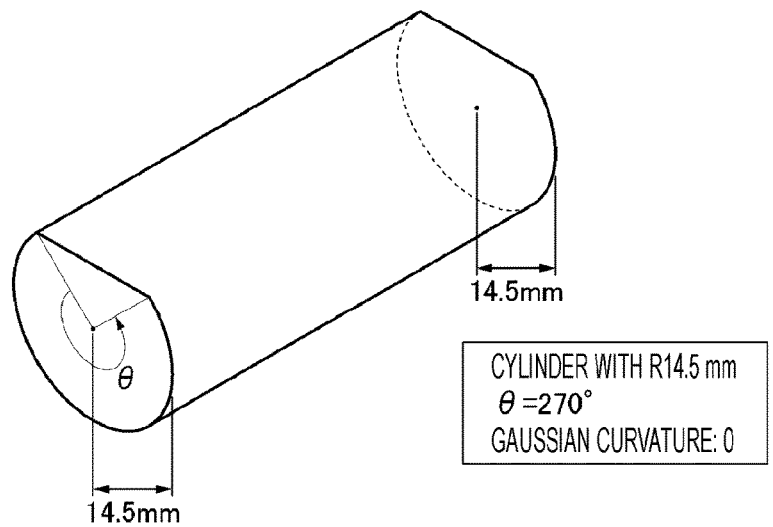
FIGS. 21A, 21B, and 21C are perspective views each showing the shape of an adherend.
Figure 21B:
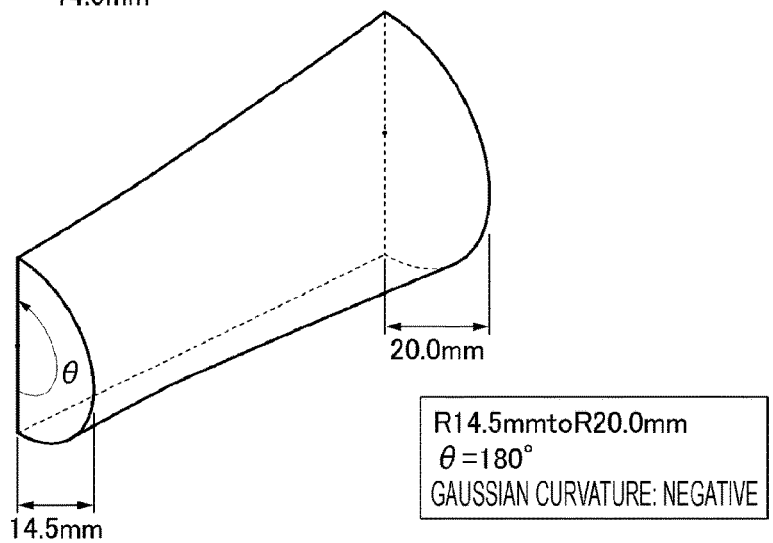
Figure 21C:
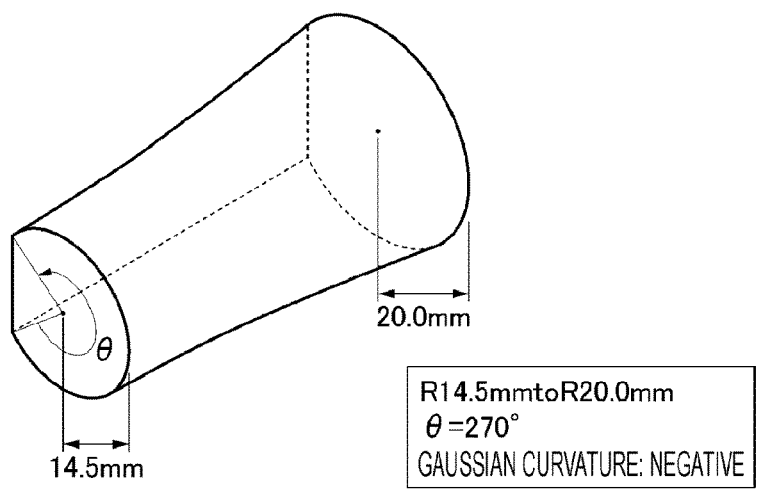
Figure 22A:
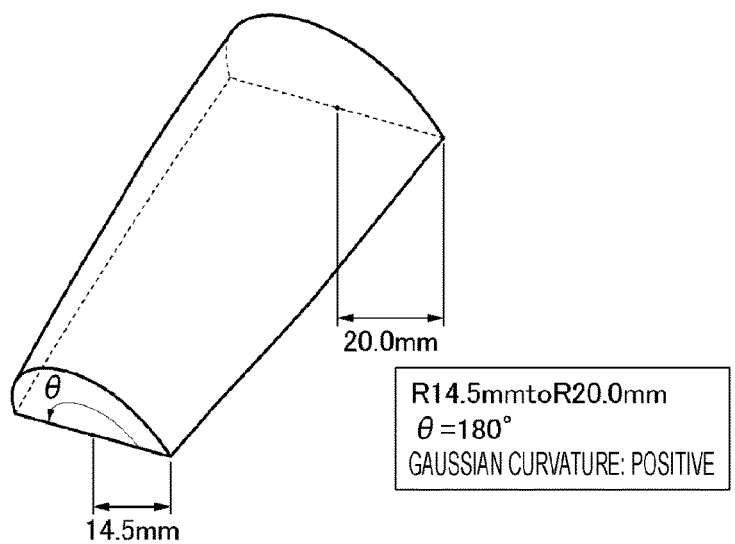
FIGS. 22A and 22B are perspective views each showing the shape of an adherend.
Figure 22B:
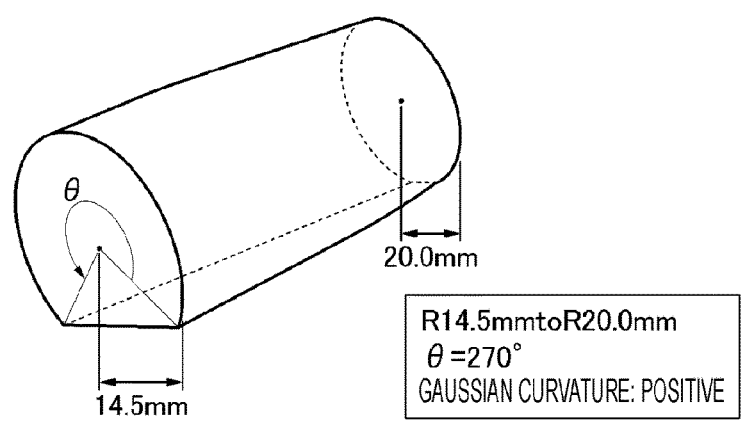

|  | Example 2 | Example 3 | Example 4 | Example 5 | Example 6 |
| --- | --- | --- | --- | --- | --- |
| Type of adherend | FIG. 21A | FIG. 21B | FIG. 21C | FIG. 22A | FIG. 22B |
| Upper electrode base material | No wrinkles | No wrinkles | No wrinkles | No wrinkles | No wrinkles |
| Deformed layer | No wrinkles | No wrinkles | No wrinkles | No wrinkles | No wrinkles |
| Sensor electrode layer | No wrinkles | Bonded without wrinkles, branch portions having spaces | Bonded without wrinkles, branch portions having spaces | Bonded without wrinkles, branch portions having spaces | Bonded without wrinkles, branch portions having spaces |
| Lower electrode base material | No wrinkles | No wrinkles | No wrinkles | No wrinkles | No wrinkles |

Table 4 shows the results of evaluation of the sensors of Examples 7 to 11.

TABLE 4

|  | Example 7 | Example 8 | Example 9 | Example 10 | Example 11 |
| --- | --- | --- | --- | --- | --- |
| Type of adherend | FIG. 21A | FIG. 21B | FIG. 21C | FIG. 22A | FIG. 22B |
| Curved surfaces are collectively bonded after all planar surface layers are bonded | No wrinkles | No wrinkles (crushed) | No wrinkles (crushed) | No wrinkles (crushed) | No wrinkles (crushed) |

The following can be seen from Tables 3 and 4. That is, as the electrode base member 22, the sensor electrode layer 21, and the electrode base member 23 each have a plurality of slits, formation of wrinkles can be prevented in a case where the respective layers are sequentially bonded to an adherent to form a sensor 20, and in a case where the respective layers are stacked beforehand to form a sensor 20 that is then bonded to an adherend.

Although the first and second embodiments of the present disclosure, and modifications thereof have been specifically described so far, the present disclosure is not limited to the first and second embodiments and the modifications thereof described above, and various changes based on the technical idea of the present disclosure may be made to them.

For example, the configurations, the methods, the processes, the shapes, the materials, the numerical values, and the like mentioned in the above described first and second embodiments, and the modifications thereof are merely examples, and configurations, methods, processes, shapes, materials, numerical values, and the like that differ from those mentioned above may be used as needed.

Furthermore, the configurations, methods, processes, shapes, materials, numerical values, and the like mentioned in the above first and second embodiments, and the modifications thereof can be combined as appropriate, without departing from the scope of the present disclosure.

In the cases described above in the first and second embodiments, the present disclosure is applied to capacitive sensors. However, the present disclosure is not limited to capacitance-type sensors, and can also be applied to variable-resistance or piezoelectric sensors or the like.

The present disclosure can also adopt the configurations described below.

(1)

A pressure sensor including:

a sensor electrode layer that is of a capacitive type and includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, in which the sensor electrode layer, the first reference electrode layer, and the second reference electrode layer have a slit.

(2)

The pressure sensor according to (1), in which the sensor electrode layer includes:

a trunk portion; and a plurality of branch portions extending like branches from the trunk portion, and the slit is disposed between adjacent ones of the branch portions.

(3)

The pressure sensor according to (1) or (2), in which the first reference electrode layer and the second reference electrode layer have two end portions facing each other, and the slit extends inward from the two end portions facing each other.

(4)

The pressure sensor according to any one of (1) to (3), in which extending directions of the slit of the sensor electrode layer and the slit of the first reference electrode layer differ from each other, and extension directions of the slit of the sensor electrode layer and the slit of the second reference electrode layer differ from each other.

(5)

The pressure sensor according to any one of (1) to (4), in which the sensor electrode layer includes:

a first electrode including a plurality of first sub electrodes; and a second electrode including a plurality of second sub electrodes, and the sensing units are formed with the first sub electrodes and the second sub electrodes that are alternately arranged at regular intervals.

(6)

The pressure sensor according to any one of (1) to (4), in which the sensor electrode layer includes:

a first electrode having a first comb-like shape; and a second electrode having a second comb-like shape, and the sensing units are formed with the first electrode and the second electrode that are arranged to make the first comb-like shape and the second comb-like shape mesh with each other.

(7)

The pressure sensor according to any one of (1) to (6), further including a tubular elastomer layer that covers a sensor main frame including the sensor electrode layer, the first reference electrode layer, the second reference electrode layer, the elastic layer, and the gap layer.

(8)

The pressure sensor according to any one of (1) to (8), in which the elastic layer contains a foamed resin or an elastomer.

(9)

A pressure sensor including:

a capacitive sensor electrode layer that includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, in which the sensor electrode layer, the first reference electrode layer, and the second reference electrode layer have a trunk portion and a plurality of branch portions extending like branes from the trunk portion.

(10)

A pressure sensor including:

a sensor electrode layer that includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, in which the sensor electrode layer, the first reference electrode layer, and the second reference electrode layer have a slit.

(11)

An Electronic Apparatus Including:

an exterior member having a curved surface; and the pressure sensor according to any one of (1) to (10), the pressure sensor being bonded to the curved surface.

(12)

The electronic apparatus according to (11), in which the curved surface is a curved surface having non-uniform curvature.

REFERENCE SIGNS LIST

10 Electronic apparatus
10S Curved surface
11 Sensor module
12 Host device
13 Controller IC
20 Sensor
20A, 120A Connecting portion
20B, 120B Connection terminal
20SE Sensing unit
21, 121 Sensor electrode layer
21A Base member
21B Protective layer
21C Pulse electrode (first electrode)
21D Sense electrode (second electrode)
21C$_1$, 21D$_1$ Sub electrode
21E, 21F Wiring line
21M, 22M Trunk portion
21N, 22N Branch portion
22, 23, 122, 123 Electrode base member
22A, 23A Base member
22B, 23B Reference electrode layer
24, 124, 125 Elastic layer
25 Gap layer
26A, 26B, 27A, 27B Adhesive layer
126, 127 Elastomer layer
21L, 22L, 24L, 25L Slit
110 Adherend
111 Recess
110S Cylindrical surface
120B Sensor main frame
131 Mold
132 Space

The invention claimed is:

1. A pressure sensor comprising:
a sensor electrode layer that is of a capacitive type and includes a plurality of sensing units;
a first electrode base member including a first reference electrode thin film that faces a first surface of the sensor electrode layer;
a second electrode base member including a second reference electrode thin film that faces a second surface of the sensor electrode layer;
an elastic layer disposed between the first reference electrode thin film and the sensor electrode layer; and
a gap layer disposed between the second reference electrode thin film and the sensor electrode layer,
wherein the sensor electrode layer, the first reference electrode thin film, and the second reference electrode thin film each have a respective slit.

2. The pressure sensor according to claim 1, wherein the sensor electrode layer includes:
a trunk portion; and
a plurality of branch portions extending like branches from the trunk portion, and
the slit is disposed between adjacent ones of the branch portions.

3. The pressure sensor according to claim 1, wherein the first reference electrode thin film and the second reference electrode thin film have two end portions facing each other, and
the slit extends inward from the two end portions facing each other.

4. The pressure sensor according to claim 1, wherein extending directions of the slit of the sensor electrode layer and the slit of the first reference electrode thin film differ from each other, and
extension directions of the slit of the sensor electrode layer and the slit of the second reference electrode thin film differ from each other.

5. The pressure sensor according to claim 1, wherein the sensor electrode layer includes:
a first electrode including a plurality of first sub electrodes; and
a second electrode including a plurality of second sub electrodes, and the sensing units are formed with the first sub electrodes and the second sub electrodes that are alternately arranged at regular intervals.

6. The pressure sensor according to claim 1, wherein the sensor electrode layer includes:

a first electrode having a first comb-like shape; and a second electrode having a second comb-like shape, and the sensing units are formed with the first electrode and the second electrode that are arranged to make the first comb-like shape and the second comb-like shape mesh with each other.

7. The pressure sensor according to claim 1, further comprising a tubular elastomer layer that covers a sensor main frame including the sensor electrode layer, the first reference electrode thin film, the second reference electrode thin film, the elastic layer, and the gap layer.

8. The pressure sensor according to claim 1, wherein the elastic layer contains a foamed resin or an elastomer.

9. An electronic apparatus comprising:

an exterior member having a curved surface; and the pressure sensor according to claim 1, the pressure sensor being bonded to the curved surface.

10. The electronic apparatus according to claim 9, wherein the curved surface is a curved surface having non-uniform curvature.

11. The pressure sensor according to claim 1, wherein each one of the respective slits extends entirely through one of the respective layers of the sensor electrode layer, the first electrode base member, and the second electrode base member.

12. A pressure sensor comprising:

a capacitive sensor electrode layer that includes a plurality of sensing units;

a first reference electrode layer that faces a first surface of the sensor electrode layer;

a second reference electrode layer that faces a second surface of the sensor electrode layer;

an elastic layer disposed between the first reference electrode layer and the sensor electrode layer; and a gap layer disposed between the second reference electrode layer and the sensor electrode layer, wherein the sensor electrode layer, the first reference electrode layer, and the second reference electrode layer have a trunk portion extending in a first direction, which is greater than a perpendicular second direction, with a plurality of branch portions arranged in the first direction and each extending like branches from the trunk portion in opposite directions in the second direction.

13. A pressure sensor comprising:

a sensor electrode layer that includes a plurality of sensing units;

a first electrode base member including a first reference electrode thin film that faces a first surface of the sensor electrode layer;

a second electrode base member including a second reference electrode thin film that faces a second surface of the sensor electrode layer;

an elastic layer disposed between the first reference electrode thin film and the sensor electrode layer; and a gap layer disposed between the second reference electrode thin film and the sensor electrode layer, wherein the sensor electrode layer, the first reference electrode thin film, and the second reference electrode thin film each have a respective slit.

14. The pressure sensor according to claim 13, wherein each one of the respective slits extends entirely through one of the respective layers of the sensor electrode layer, the first electrode base member, and the second electrode base member.

* * * * *